US011575239B2

United States Patent
Kokki et al.

(10) Patent No.: US 11,575,239 B2
(45) Date of Patent: Feb. 7, 2023

(54) OPTICAL FIBER CLADDING LIGHT STRIPPER

(71) Applicant: NLIGHT, INC., Vancouver, WA (US)

(72) Inventors: Teemu Kokki, Vancouver, WA (US); Christopher Luetjen, Vancouver, WA (US); Ryan Hawke, Vancouver, WA (US)

(73) Assignee: nLIGHT, Inc., Camas, WA (US)

( * ) Notice: Subject to any disclaimer, the term of this patent is extended or adjusted under 35 U.S.C. 154(b) by 0 days.

(21) Appl. No.: 16/577,981

(22) Filed: Sep. 20, 2019

(65) Prior Publication Data

US 2020/0099190 A1 Mar. 26, 2020

Related U.S. Application Data

(60) Provisional application No. 62/734,946, filed on Sep. 21, 2018.

(51) Int. Cl.
*H01S 3/067* (2006.01)
*H01S 3/16* (2006.01)
(Continued)

(52) U.S. Cl.
CPC ...... *H01S 3/06733* (2013.01); *G02B 6/02085* (2013.01); *H01S 3/08018* (2013.01); *H01S 3/1618* (2013.01); *G02B 2006/0209* (2013.01)

(58) Field of Classification Search
CPC ............ G02B 6/02057; G02B 6/02066; G02B 6/02076; G02B 2006/0209; H01S 3/08018–0805
See application file for complete search history.

(56) References Cited

U.S. PATENT DOCUMENTS 3,891,302 A * 6/1975 Dabby ............... G02B 6/02066
385/37
3,976,356 A * 8/1976 Jenkins .................... G02B 6/02
385/126
(Continued)

FOREIGN PATENT DOCUMENTS

CA 2244572 A1 * 2/1999 ......... G02B 6/02095
CA 2468784 C * 1/2010 ......... G02B 6/02033
(Continued)

OTHER PUBLICATIONS

Zhu et al., "Mode-Couplings in Two Cascaded Helical Long-Period Fibre Gratings and their Application to Polarization-Insensitive Band-Rejection Filter", Apr. 17, 2018, Optics Communications 423, 81-85. (Year: 2018).*

(Continued)

*Primary Examiner* — Joshua King
(74) *Attorney, Agent, or Firm* — Stoel Rives LLP

(57) ABSTRACT

Multi-clad optical fiber cladding light stripper (CLS) comprising an inner cladding with one or more recessed surface regions to remove light propagating within the inner cladding. A CLS may comprise such recessed surface regions along two or more azimuthal angles about the fiber axis, for example to improve stripping efficiency. One or more dimensions, or spatial distribution, of the recessed surface regions may be randomized, for example to improve stripping uniformity across a multiplicity of modes propagating within a cladding. Adjacent recessed surface regions may abut, for example, end-to-end, as segments of a recess that occupies a majority, or even an entirety, of the length of a fiber surrounded by a heat sink. One or more dimensions, or angular position, of individual ones of the abutted recessed surface regions may vary, according to a regular or irregular pattern.

9 Claims, 12 Drawing Sheets

(51) Int. Cl.
*H01S 3/08* (2006.01)
*G02B 6/02* (2006.01)

(56) References Cited

U.S. PATENT DOCUMENTS

| | | | | |
|---|---|---|---|---|
| 5,222,795 | A * | 6/1993 | Hed | G02B 6/001 362/558 |
| 5,321,257 | A * | 6/1994 | Danisch | G02B 6/02066 250/227.16 |
| 5,633,966 | A * | 5/1997 | Nakaishi | G02B 6/02138 359/566 |
| 5,790,735 | A * | 8/1998 | Oleskevich | C03B 37/01234 372/6 |
| 5,867,616 | A * | 2/1999 | Antos | C03B 37/01493 385/11 |
| 5,926,592 | A * | 7/1999 | Harris | G02B 21/0032 385/33 |
| 5,995,697 | A * | 11/1999 | Byron | G02B 6/02104 385/123 |
| 6,073,465 | A * | 6/2000 | Oleskevich | C03B 37/01234 65/390 |
| 6,278,827 | B1 * | 8/2001 | Sugiyama | G02B 6/001 385/123 |
| 6,314,220 | B1 * | 11/2001 | Mossberg | G02B 5/1819 359/558 |
| 6,714,711 | B1 * | 3/2004 | Lieberman | G01N 21/7703 362/552 |
| 6,799,880 | B2 | 10/2004 | Gozum et al. | |
| 6,925,230 | B2 * | 8/2005 | Kopp | G02B 6/02085 385/27 |
| 7,095,911 | B2 * | 8/2006 | Kopp | G02B 6/02085 385/10 |
| 7,748,913 | B2 | 7/2010 | Oba | |
| 8,542,971 | B2 | 9/2013 | Chatigny | |
| 8,885,993 | B2 | 11/2014 | Desbiens et al. | |
| 8,948,218 | B2 | 2/2015 | Gapontsev et al. | |
| 9,122,009 | B1 * | 9/2015 | Griffin | G02B 6/3813 |
| 9,136,663 | B2 | 9/2015 | Taya | |
| 9,217,840 | B2 | 12/2015 | Fomin et al. | |
| 9,223,089 | B1 * | 12/2015 | Griffin | H01S 3/094003 |
| 9,435,945 | B2 | 9/2016 | Gapontsev et al. | |
| 9,534,952 | B2 | 1/2017 | Creeden et al. | |
| 9,547,121 | B2 | 1/2017 | Hou et al. | |
| 9,977,181 | B2 * | 5/2018 | Ikoma | G02B 6/03622 |
| 10,348,051 | B1 | 7/2019 | Shah et al. | |
| 10,389,080 | B2 * | 8/2019 | Tanaka | H01S 3/0405 |
| 10,802,209 | B2 * | 10/2020 | Wu | H01S 3/094007 |
| 2002/0131707 | A1 * | 9/2002 | Kopp | G02B 6/02085 385/37 |
| 2002/0186947 | A1 * | 12/2002 | Abe | G02B 6/245 385/128 |
| 2003/0118265 | A1 * | 6/2003 | Kopp | G02B 6/274 385/11 |
| 2006/0062518 | A1 * | 3/2006 | Galstian | G02B 6/266 385/27 |
| 2006/0093012 | A1 * | 5/2006 | Singh | H01S 5/141 372/102 |
| 2006/0215976 | A1 * | 9/2006 | Singh | G02B 6/0208 385/126 |
| 2007/0065083 | A1 * | 3/2007 | Singh | G02B 6/001 385/126 |
| 2007/0071389 | A1 * | 3/2007 | Yoon | G02B 6/02066 385/37 |
| 2007/0253669 | A1 * | 11/2007 | Singh | G02B 6/001 385/128 |
| 2008/0223822 | A1 * | 9/2008 | Singh | G02B 6/001 216/24 |
| 2010/0188735 | A1 | 7/2010 | Tamaoki | |
| 2013/0016742 | A1 * | 1/2013 | Sakamoto | G02B 6/02138 372/6 |
| 2013/0308661 | A1 * | 11/2013 | Nishimura | H01S 3/0675 372/6 |
| 2014/0086526 | A1 | 3/2014 | Starodubov et al. | |
| 2014/0211818 | A1 * | 7/2014 | Hou | B23K 26/36 372/6 |
| 2014/0270637 | A1 | 9/2014 | Desbiens et al. | |
| 2014/0363125 | A1 * | 12/2014 | Schwarzenbach | G02B 6/14 385/29 |
| 2017/0110845 | A1 | 4/2017 | Hou et al. | |
| 2017/0331244 | A1 * | 11/2017 | Karlsen | B23K 26/00 |
| 2017/0371097 | A1 * | 12/2017 | Wu | G02B 6/14 |
| 2018/0045895 | A1 | 2/2018 | Lee et al. | |
| 2018/0059323 | A1 | 3/2018 | Rivera et al. | |
| 2019/0324220 | A1 * | 10/2019 | Tanaka | G02B 6/14 |
| 2019/0361171 | A1 | 11/2019 | Lee | |

FOREIGN PATENT DOCUMENTS

| | | | | |
|---|---|---|---|---|
| CN | 101622030 A * | 1/2010 | | G02B 6/001 |
| CN | 103314254 A * | 9/2013 | | F21V 13/08 |
| CN | 203595831 | 5/2014 | | |
| CN | 203595831 U | 5/2014 | | |
| CN | 104749694 A | 7/2015 | | |
| CN | 104749694 A * | 7/2015 | | |
| CN | 104880764 A * | 9/2015 | | |
| CN | 105676354 A | 6/2016 | | |
| CN | 206020714 U * | 3/2017 | | |
| CN | 108152882 A * | 6/2018 | | |
| CN | 108333672 A * | 7/2018 | | |
| CN | 109416436 A * | 3/2019 | | H01S 3/06708 |
| CN | 109428256 A * | 3/2019 | | G02B 6/4296 |
| CN | 109541750 A * | 3/2019 | | |
| CN | 109541750 A | 3/2019 | | |
| CN | 110676677 A * | 1/2020 | | |
| GB | 2188719 A * | 10/1987 | | G01L 1/245 |
| GB | 2188719 B | 8/1990 | | |
| JP | 58001105 A * | 1/1983 | | G02B 6/001 |
| JP | 2007527031 A * | 9/2007 | | G02B 6/036 |
| JP | 2008198637 A | 8/2008 | | |
| JP | 2011118208 A | 6/2011 | | |
| JP | 5113400 B2 * | 1/2013 | | G02B 6/04 |
| JP | 2014010258 | 1/2014 | | |
| JP | 2014010258 A | 1/2014 | | |
| JP | 2014010258 A * | 1/2014 | | |
| JP | 2016029454 A * | 3/2016 | | |
| JP | 2018124428 | 8/2018 | | |
| JP | 2018124428 A | 8/2018 | | |
| JP | 2018124428 A * | 8/2018 | | |
| JP | 2019049698 A * | 3/2019 | | G02B 6/4296 |
| KR | 100405969 B1 * | 11/2003 | | |
| KR | 20140141242 A * | 12/2014 | | B24B 5/045 |
| KR | 102143426 B1 * | 8/2020 | | |
| WO | WO-9706456 A1 * | 2/1997 | | C03B 37/01493 |
| WO | 2011067908 | 6/2011 | | |
| WO | 2011067908 A1 | 6/2011 | | |
| WO | WO-2011067908 A1 * | 6/2011 | | B23K 26/0823 |
| WO | WO-2017191685 A1 * | 11/2017 | | A61B 1/00002 |
| WO | 2018003604 | 1/2018 | | |
| WO | 2018003604 A1 | 1/2018 | | |
| WO | 2018075799 | 4/2018 | | |
| WO | 2018075799 A1 | 4/2018 | | |
| WO | WO-2018138473 A1 * | 8/2018 | | G02B 6/4209 |
| WO | WO-2020138357 A1 * | 7/2020 | | C03C 25/6213 |

OTHER PUBLICATIONS

Gao et al., "Multi-Phase-Shifted Helical Long Period Fiber Grating Based Temperature-Insensitive Optical Twist Sensor", Jun. 19, 2014, Optics Express, 22, 13,15697-15709. (Year: 2014).*
International Search Report and Written Opinion for International Patent Application No. PCT/US19/53341, dated Dec. 19, 2019.
International Search Report and Written Opinion for International Patent Application No. PCT/US19/48011, dated Nov. 7, 2019.
Non-Final Office Action for U.S. Appl. No. 16/550,058, dated Jul. 1, 2020.
International Search Report and Written Opinion for International Patent Application No. PCT/US2019/048011, dated Nov. 7, 2019, 6 pages.

(56) References Cited

OTHER PUBLICATIONS

International Search Report and Written Opinion for International Patent Application No. PCT/US2019/052241, dated Dec. 19, 2019, 8 pages.
Non-Final Office action from U.S. Appl. No. 16/550,058, dated Jul. 1, 2020, 22 pages.
Supplementary European Search Report from European Patent Application 19862724.2, dated May 2, 2022, 10 pages.
Supplementary European Search Report from European Patent Application No. 19859683.5, dated Apr. 20, 2022, 6 pages.
Jebali M A, et al., "All fiber cladding mode stripper with uniform heat distribution and high cladding light loss manufactured by COlaser ablation", Proceedings of SPIE; vol. 10513, Feb. 20, 2018, p. 105131 Q XP060100117.

* cited by examiner

OPTICAL FIBER CLADDING LIGHT STRIPPER

CLAIM OF PRIORITY

This application claims priority to U.S. Provisional Patent Application Ser. No. 62/734,946, filed on Sep. 21, 2018, and titled "OPTICAL FIBER CLADDING LIGHT STRIPPER", which is incorporated by reference in its entirety.

BACKGROUND

The laser industry continues to increase laser performance metrics, such as average power, pulse energy, and peak power. Some fiber laser systems employ multi-clad fiber. In contrast to single-clad fiber having only a core surrounded by one cladding material, multi-clad fiber includes a core surrounded by two or more cladding material layers. Double-clad fiber (DCF), for example, includes a core in which a source beam may propagate while pump light is to propagate within a first, or "inner" cladding that surrounds the core. The inner cladding may provide an index contrast with the core to guide the source beam and to also guide the pump light into the core where it may be absorbed by one or more dopants (e.g., Ytterbium, Erbium, etc.) along a length of the fiber. A second, or "outer," cladding further surrounds the inner cladding. Typically, light that enters the outer cladding is lost from the system. However, light within the inner cladding may propagate over significant distances within a fiber system. Because the retention of "cladding light" within the inner cladding may be detrimental to system performance, "cladding light strippers" (CLS) may be employed within an optical fiber system to remove such cladding light.

Some conventional CLS architectures include one or more materials operable to remove cladding light. For example, a layer of a high-index material (e.g., exceeding the index of the inner cladding material, or exceeding the index of a material index-matched to the inner cladding material) may be applied onto the inner cladding (or index-matched material) within a fiber length where the outer cladding has been removed. The high-index material, often a polymer, has a suitable index contrast with the inner cladding (or index-matched material) to "un-guide" light propagating with the inner cladding. Over a fiber length of the CLS more than one high-index material may be employed, or the index may otherwise vary, for example to better distribute the thermal load. The high-index material may further have an index that varies inversely as a function of temperature such that a portion of CLS that becomes hotter becomes less efficient at further stripping the cladding light than another, cooler, portion.

Some other conventional CLS architectures may include one or more structures operable to remove cladding light. For example, an outer surface of the inner cladding may be roughened, or much larger features on the order of the cladding diameter, may be milled into the inner cladding for the purpose of scattering, reflecting, refracting and/or diffracting out light.

To date, with the conventional CLS architectures it may be difficult to attain both high stripping efficiency across a large number of modes that may be propagating within the cladding, and good thermal load management. For example, the addition of materials to unguide cladding light may be difficult to spatially distribute and/or otherwise prevent hot spots where stripping is localized to a small region within the CLS. Roughening may also lead to hot spots and/or otherwise uncontrolled stripping within a CLS. While fiber-scale notching of the cladding may improve thermal load management, it can suffer non-uniform mode stripping efficiency, for example where a spatial distribution of the notches perturbs some cladding-light modes significantly more than other modes.

Techniques and fiber system architectures that mitigate problems associated with such conventional CLS architectures may therefore be advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale, although where relevant an attempt is made to depict relative dimensions in a manner consistent with parameters provided in the written description. Further, where considered appropriate, reference labels have been repeated among the figures to indicate corresponding, or analogous, elements. In the figures.

DETAILED DESCRIPTION

Figures 1A, 1B:
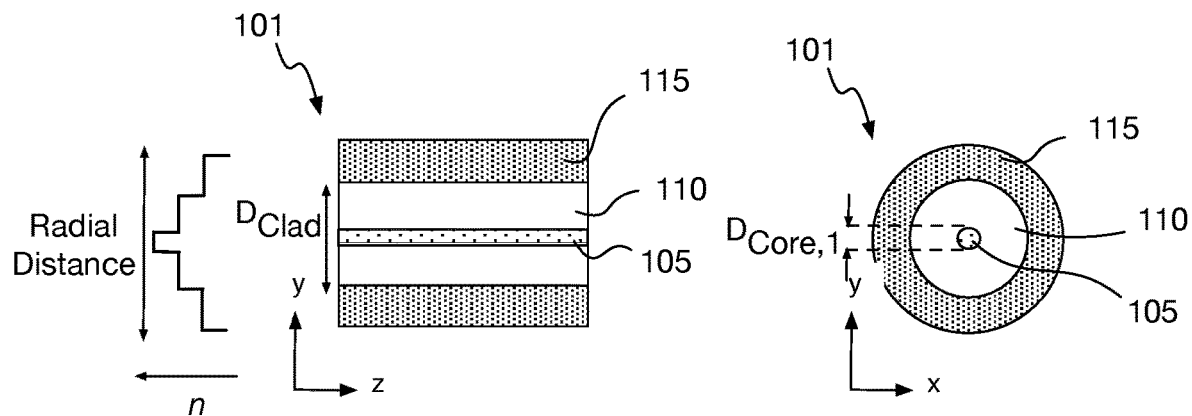
FIG. 1A is a cross-sectional view of a double-clad fiber with the optical fiber axis in the plane of the page, in accordance with some embodiments.
FIG. 1B is a cross-sectional view of the double-clad fiber in FIG. 1A with the optical fiber axis perpendicular to the plane of the page, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" means that a particular feature, structure, function, or characteristic described in connection with the embodiment is included in at least one embodiment of the invention. Thus, the appearances of the phrase "in an embodiment" or "in one embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "over," "under," "between," and "on" as used herein refer to a relative position of one component or material with respect to other components or materials where such physical relationships are noteworthy.

Unless otherwise specified in the explicit context of their use, the terms "substantially equal," "about equal" and "approximately equal" mean that there is no more than incidental variation between among things so described. In the art, such variation is typically no more than +/−10% of a predetermined target value.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

Described herein are multi-clad optical fiber systems having a length of optical fiber in which there is a cladding light stripper (CLS) comprising an inner cladding with one or more recessed surface regions to remove light propagating within the inner cladding. The recessed surface regions extend into the inner cladding to some desired depth, and are to induce optical perturbations in the fiber waveguide that allow light propagating within the cladding (originating for example from a pump laser) to escape out of the cladding.

The recessed surface regions may be located along two or more angular positions about the fiber axis, for example alternating positions that are approximately orthogonal about the fiber axis to more uniformly impact various modes propagating within the fiber. Increasing a cumulative range of the angular position occupied by the recessed surface regions may increase stripping efficiency. To mitigate, or avoid, a concomitant reduction in mechanical strength of the fiber, a transverse width of individual ones of the recesses may be limited, for example to significantly less than the cladding diameter. In some further embodiments, longitudinal spacing of the recesses may be such that longitudinal overlap between two recesses having different angular positions is avoided, for example to maintain the mechanical strength of the fiber within the CLS while still locating the perturbation structures over a wide cumulative azimuthal angle.

As also described further below, one or more physical dimensions, or the spatial distribution, of the recessed surface regions may be randomized. Whereas a regular pattern of structural perturbations might limit the highest losses to only some subset of modes, randomization in accordance with embodiments herein may ensure the cladding perturbations do not form a regular pattern that repeats over a fiber length of the CLS. With perturbation randomization, cylindrical symmetry may be avoided and a greater number of modes may experience high losses. In some embodiments, the physical dimensions of individual recessed surface regions (e.g., the depth, arc length, or longitudinal length) are randomized, which may improve stripping uniformity across a multiplicity of modes propagating within a cladding. In other embodiments, the spatial distribution (e.g., angular positions and longitudinal spacing) of the recessed surface regions is randomized, which may also improve stripping uniformity across a multiplicity of modes propagating within a cladding. In some further embodiments, both physical dimensions and spatial distribution is randomized.

While a transverse width (e.g., arc length) of individual ones of the recesses may be advantageously limited, and longitudinal overlap avoided, adjacent recessed surface regions may nevertheless abut, for example, end to end, as segments of an elongated recess that may occupy a majority, or even an entirety, of the length of a fiber of a CLS (e.g., that is surrounded by a heat sink). Continuous perturbation along the propagation axis may induce some amount of mode mixing along the entire length of the CLS such that light may be stripped at all points along the CLS to provide high stripping efficiency. A small transverse width of such an elongated recessed region may be relied upon to maintain mechanical strength of the fiber. Where an elongated recessed region achieves sufficiently high efficiency, a CLS may comprise only one such recessed region. To help induce some amount of mode mixing along the entire length of an elongated recessed region, one or more physical dimensions, or angular positions, of individual ones of these abutted segments may vary along the longitudinal length of the recess. Such variation may be according to a regular (predictable) pattern, or such variation may be according to an irregular pattern resulting from randomization of one or more parameters of the abutted segments. Examples of an irregular pattern include a fixed feature shape that is spaced apart from neighboring features in a non-repeating, (pseudo) random manner. Examples of an irregular pattern also include a feature shape that is modulated in a non-repeating, (pseudo)random manner.

FIG. 1A is a cross-sectional view of a fiber 101 with the optical fiber axis in the plane of the page, in accordance with some embodiments. FIG. 1B is a cross-sectional view of the double-clad, single core fiber 101 with the optical fiber axis perpendicular to the plane of the page, in accordance with some embodiments. Although any optical fiber known in the art that is compatible with attributes of CLS architectures described herein may be employed, in some exemplary embodiments a multi-clad optical fiber is coupled to an input and/or output of a CLS. In the illustrated example, optical fiber 101 is a double clad optical fiber. In other embodiments, the multi-clad fiber is a triple clad optical fiber. Additional core and/or cladding layers are also possible (e.g., multi-core, quad-clad, etc.)

Fiber 101 may have any refractive index profile (RIP) suitable for a multi-clad fiber. As used herein, the term "refractive-index profile" or "RIP" refers to the refractive index as a function of position along a line (e.g., y axis in FIG. 1A) or in a plane (e.g. x-y plane in FIG. 1B) perpendicular to the fiber axis (e.g., z-axis in FIG. 2A). In the example shown in FIGS. 1A and 1B, fiber 101 is angularly symmetric, in which case the 1D RIP is identical for any azimuth angle. Alternatively, for example in birefringent fiber architectures, RIP may vary as a function of an azimuth angle about the fiber axis.

In the example illustrated in FIGS. 1A and 1B, fiber 101 has a radially symmetric RIP with a central core 105, and an inner cladding 110, which is annular and encompasses core 105. Inner cladding 110 is surrounded by an annular outer cladding 115. Core 105, inner cladding 110, and outer cladding 115 can each have any RIP including, but not limited to, a step-index and graded-index. A "step-index fiber" has a RIP that is substantially flat (refractive index independent of position) within fiber core 105. Inner cladding 110 may also have a substantially flat RI over cladding diameter $D_{Clad}$. The RIP of fiber 101 may be stepped at the interface between core 105 and inner cladding 110. Alternatively, one or more of core 105 and inner cladding 110 may have a "graded-index" in which the RI varies (e.g., decreases) with increasing radial position (i.e., with increasing distance from the core and/or cladding axis)). Core 105 may be suitable for single-mode or multimode propagation of light. Inner cladding 110 may have an area larger than that of the core, may also have a higher NA (numerical aperture) and may support a large number of propagation modes. Core 105 and inner cladding 110 may have any suitable composition (e.g., glass). Outer cladding 115 may be a polymer or also glass, for example.

Although core 105 and inner cladding 110 is illustrated as being concentric, it need not be. Core 105 may also be a variety of shapes other than circular, such as, but not limited to annular, polygonal, arcuate, elliptical, or irregular. Core 105 and inner cladding 110 in the illustrated embodiments are co-axial, but may alternatively have axes offset with respect to one another. As shown in FIG. 1A, inner cladding 110 has an average outer diameter $D_{Clad}$, while core 105 has an average outer diameter $D_{Core}$. Diameters $D_{Clad}$ and $D_{Core}$ are illustrated to be constants about the central fiber axis in the longitudinal direction (z-axis in FIG. 1A). However, the diameters $D_{Clad}$ and $D_{Core}$ may instead vary over a longitudinal length of fiber 101. In some exemplary embodiments, fiber 101 is multi-mode (MM) fiber and the core diameter $D_{Core}$ is in the range of 10-100 micron (μm) while the inner cladding diameter $D_{Clad}$ is in the range of 200-1000 μm, although other values for each are possible.

Figure 1C:
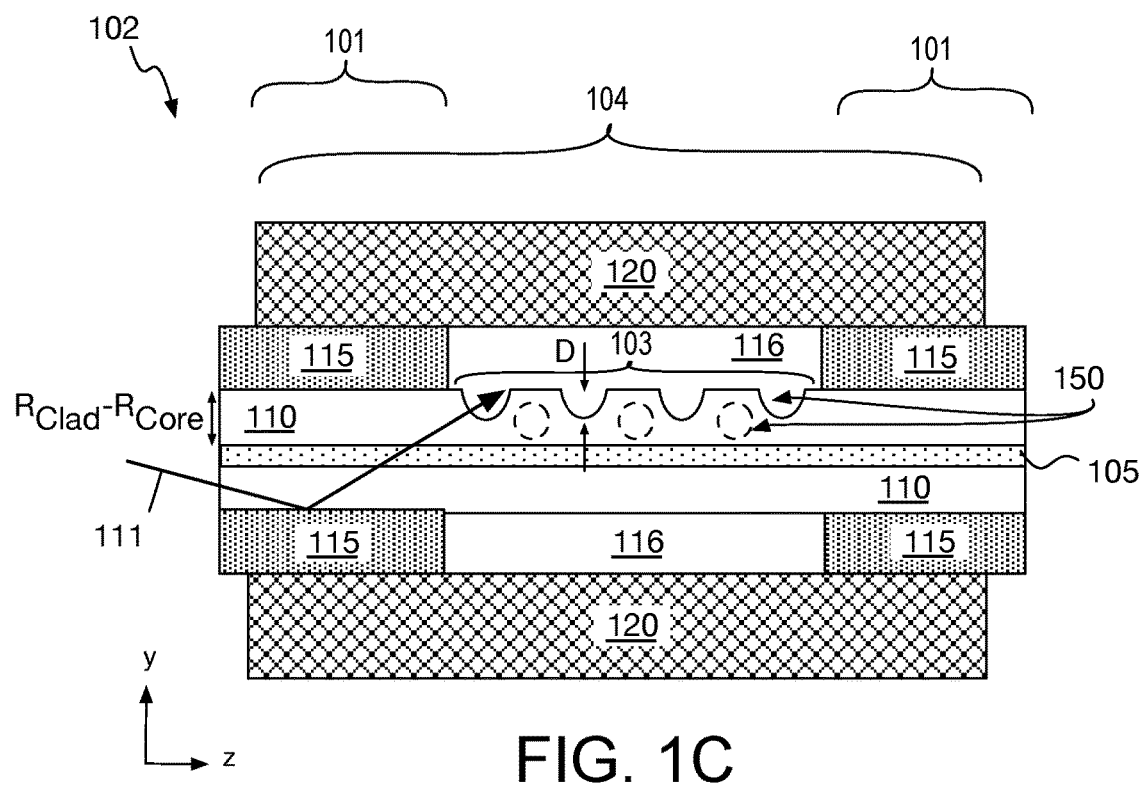
FIG. 1C is a cross-sectional view of a fiber system including a cladding light stripper (CLS), in accordance with some embodiments.

In accordance with some embodiments, light propagating within a multi-clad fiber length may be input to, and/or output from, a CLS, which comprises a length of fiber that includes one or more surface regions that are recessed from the cladding diameter $D_{Clad}$. FIG. 1C is a cross-sectional view of a fiber apparatus 102, in accordance with some embodiments. As shown, fiber apparatus 102 includes two lengths of (double clad) fiber 101 coupled to opposite ends of a CLS that comprises a fiber length 103. The lengths of fiber 101 may be coupled to fiber length 103 in any suitable manner. In some embodiments, core 105 and inner cladding 110 are continuous between the lengths of fiber 101 and fiber length 103 such that fiber length 103 is merely a portion of fiber length 101. In other embodiments, fiber length 103 is spliced, or otherwise joined end-to-end to the lengths of fiber 101 with the axes of the core 105 and inner cladding 110 substantially aligned with the corresponding axes of fiber length 103. A splice, for example may be a single fusion of two fiber-end faces that have compatible cleave angles (e.g., substantially orthogonal to the longitudinal fiber axis, or z-dimension in FIG. 1C). In some other embodiments, fiber length 103 is coupled to the lengths of fiber 101 by an optical connector (i.e., a fiber-to-fiber coupler) lacking an air gap between end faces of fiber lengths 101 and 103, or a mechanical splice in which there is an air gap between end faces of fiber lengths 101 and 103.

Fiber length 103 may comprise any finite length of fiber within which recessed surface regions 150 are located. In the example illustrated in FIG. 1C, fiber length 103 lacks an outer cladding material (e.g., lacks outer cladding 115), which for example may have been stripped away during a CLS fabrication process. In the absence of outer cladding 115, an outer surface (including recessed surface regions 150) may be exposed to free space (i.e., recessed surface regions 150 are free surfaces). Alternatively, outer cladding 115 may be present within at least some regions or locations of fiber length 103. For example outer cladding 115 may only be absent where recessed surface regions 150 are located. In still other embodiments, fiber length 103 comprises an outer cladding material (not depicted). For example, a suitable material may be applied as an outer coating over inner cladding 110 within fiber length 103, and such a material may be different than that of outer cladding 115.

Over fiber length 103, recessed surface regions 150 are to strip light propagating with inner cladding 110. Such light may be propagating to/from fiber lengths 101 and would propagate through fiber length 103 as well, but for waveguide perturbations associated with recessed surface regions 150 and/or a lack of outer cladding 115. Cladding light denoted by arrow 111 in FIG. 1C may experience total internal reflection (TIR), or nearly so, until encountering recessed surface regions 150 where cladding light 111 loss from the waveguide becomes high. It is generally desirable to remove cladding light gradually over a length of fiber (e.g., fiber length 103), for example to control the density of power dissipation, and to provide sufficient heat sinking as light stripped from inner cladding 110 may be predominantly converted to heat. Overheating the fiber or other components (e.g., ferrules, etc.) is generally undesirable. Some fiber system components have temperature limits below 100° C., and where an outer cladding 115 comprises a polymer, the upper limit on continuous operating temperature can be less than 85° C., for example.

For thermal management, a CLS may be thermally coupled to any suitable heat sink, such as but not limited to, a passive heat exchanger operable to transfer heat generated from cladding light to a fluid medium, such as ambient air or a liquid coolant. In the example illustrated in FIG. 1C, fiber apparatus 102 comprises a heat exchanger that includes an absorptive mass or block 120 machined to surround fiber length 103 with free space 116 between an interior surface of block 120 and recessed surface regions 150. Light lost within fiber length 103 is to impinge block 120. Block 120 may comprise one or more materials that are absorbing within a band of the cladding light. Block 120 advantageously also has high thermal conductivity to spread heat to an exterior surface where it may interface with an external fluid medium (e.g., air). Block 120 may be a metal, such as, but not limited to, a stainless steel. In the illustrated example, heat sink block 120 surrounds the entire fiber length 103 and overlaps a portion of fiber lengths 101. Although illustrated as a substantially straight run, fiber length 103 may have any number of bends, and may for example comprise a one or more wraps about a mandrel having a suitable radius of curvature, which may for example induce bend losses from inner cladding 110.

Ideally, recessed surface regions 150 do not significantly perturb light propagating within core 105. To avoid perturbing the core waveguide, recessed surface regions 150 may have a depth D, along a ray perpendicular to the cladding axis, that is less than the annular thickness of inner cladding 110 (e.g., $D < R_{clad} - R_{core}$). Recessed surface regions 150 may have any topology. In the example illustrated in FIG. 1C, recessed surface regions 150 have a depth that varies over the longitudinal fiber length. Variation in the depth may be a result of a beam profile of a laser employed to form the recessed surface region, or may be the result of modulations in power of a laser employed to form the recessed surface regions, for example. For the embodiments illustrated by FIG. 1C, recessed surface regions 150 have a substantially Gaussian profile along the z-dimension. Such a profile may be associated with the profile of a minimum spot size of a focused laser beam with individual ones of recessed surface regions 150 being a laser-drilled hole, or recess, associated with the minimum laser spot size. In FIG. 1C, recessed surface regions 150 illustrated in dashed line are at a different angular position than those shown in solid-line profile, and further illustrate a polygonal boundary that intersects the reference cylindrical surface of inner cladding 110. In the example illustrated by the dashed lines, the boundary of an individual recessed surface region 150 is an ellipse, for example associated with the minimum laser spot diameter and the nominal outer circumference of the inner cladding. A minimum recessed surface region 150C is further illustrated in FIG. 2, which is an isometric view of fiber length 301, in accordance with some cylindrical fiber embodiments. For recessed surface region 150C, an arc length A3 is only slightly larger than longitudinal length L3 (which may be approximately equal to a secant of arc length A3). For such embodiments, there may be little difference between the transverse width (x-dimension), and longitudinal length (z-dimension) of the boundary.

In some other embodiments, a recessed surface region may have a varying depth profile along a length associated with raster scan path of a laser beam employed to form the recessed surface region. For such embodiments, recessed surface regions 150 are directional, each being a trench, or notch, that may extend a length longer than its width in a direction parallel to the transverse width of the fiber, parallel to the longitudinal length of the fiber, or skewed somewhere therebetween.

In some embodiments, recessed surface regions are positioned at more than one angular position about the axis of an inner cladding. By introducing recessed surface regions centered at multiple angular positions, a greater circumference of the cladding may be perturbed, increasing stripping efficiency and uniformity across the multiplicity of optical modes that may be propagating within the cladding. For example, in FIG. 1C, the dashed line boundaries illustrate recessed surface regions 150 that are approximately orthogonal to those drawn in solid line profile.

Figure 2:
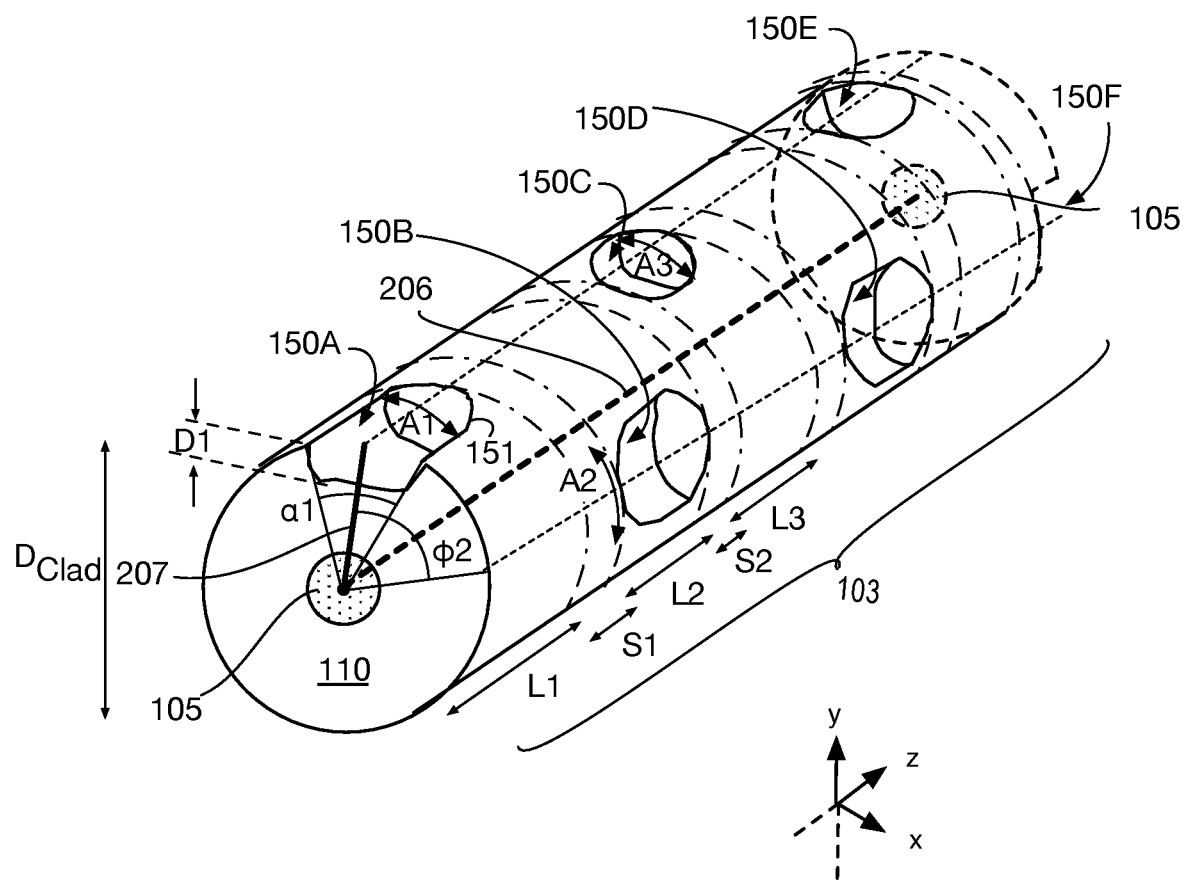
FIG. 2 is an isometric view of a length of fiber within a CLS, in accordance with some embodiments.

As further shown in FIG. 2, core 105 and inner cladding 110 share a fiber axis 206. A recessed surface region 150A is shown in partial cross-section to further illustrate the recessed surface profile. Recessed surface region 150A, along with recessed surface regions 150B, 150C, 150D, 150E, and 150F exemplify a plurality of recessed surface regions 150. Each of the recessed surface regions 150 may be parameterized, at least in part, by boundary arc length A, boundary longitudinal length L, radial depth D, and an angular boundary position, given the angular coordinate, or angular position, cp. The plurality of recessed surface regions 150 may be further parameterized, at least in part, by a longitudinal spacing S between longitudinally adjacent recessed regions. Relative angular positions and longitudinal spacing S may define the spatial distribution of recessed surface regions 150 for given region boundaries.

In the example illustrated in FIG. 2, recessed surface region 150A extends over longitudinal length L1 that is associated with some portion of fiber length 103. Recessed surface region 150A similarly has a maximum arc length A1 associated with central angle α1, and perpendicular to fiber axis 206 (i.e., parallel to the x-axis). In some embodiments, as noted above, arc length A1 may be a minimum physical dimension of a recessed region boundary, for example associated with a spot diameter of a laser intersecting a cylindrical outer surface of inner cladding 110 at some angle of incidence. The beam spot, for example may intersect a secant of inner cladding 110 that is substantially equal to the beam spot diameter if the angle of incidence is normal to tangent of the cladding surface. Hence, arc length A1 may vary. In some exemplary embodiments, arc length A1 is significantly less than inner cladding diameter $D_{clad}$. In some advantageous embodiments, arc length A1 is less than one-half of inner cladding diameter $D_{clad}$, and may be as little as 15-20% of the inner cladding diameter $D_{clad}$. For example, in some embodiments where inner cladding diameter $D_{clad}$ is between 250 and 500 μm, maximum arc length A1 is less than 100 μm, and may be as little as 75 μm, or even less (e.g., 50-60 μm). With such small arc length, a recessed region may minimally impact mechanical properties of fiber length 103.

In some embodiments where a recessed surface region has a boundary of minimum physical dimension, longitudinal length is approximately equal to the arc length. In other embodiments, a recessed surface region may have a longitudinal length that is advantageously larger than the maximum arc length, in which case the longitudinal length may be a physical dimension defined, for example, by a scan path of a laser. As described further below, a greater longitudinal length may increase stripping efficiency and/or uniformity across the set of modes propagating within the inner cladding. As shown in FIG. 2, for recessed surface region 150A, longitudinal length L1 is greater than arc length A1. For some exemplary embodiments where arc length A1 is less than 100 μm, longitudinal length L1 may vary from 100 μm to many millimeters (e.g., 150-400 mm).

Recessed surface region 150A has a maximum recess depth D1 located at reference fiber radius 207. Recess depth D1 may vary from any non-zero value to an upper bound that is somewhat less than 50% of inner cladding diameter $D_{clad}$ (e.g., less than 35% of $D_{clad}$) to ensure recessed surface region 150A does not punch through to core 105. Recess depth D1 may have a physical dimension comparable to (e.g., slightly smaller than) arc length A1. For some exemplary embodiments where arc length A1 is less than 100 μm, recess depth D1 is between 10 and 75 μm.

With boundaries and profiles of a recessed surface region so defined, a location of a recessed surface region within fiber length 103 may be further parameterized by angular position φ about fiber axis 206, which may be defined to bisect arc length A1. Angular position φ may be further defined as 0° at some reference position (e.g., falling on fiber radius 207, such that recessed surface region 150A has an angular position φ of 0°).

In some further embodiments, longitudinally adjacent recessed surface regions are non-overlapping. In the example of FIG. 2, there is only one recessed surface region within a given longitudinal fiber length. In other words, no recessed surface regions have any longitudinal overlap. For example, longitudinal length L1 does not overlap with longitudinal length L2, and instead is separated by a longitudinal spacing S1. Longitudinal length L2 likewise does not overlap with longitudinal length L3, and longitudinal length L3 does not overlap with longitudinal length L4, etc. Avoiding longitudinal overlap may ensure fiber length 103 maintains sufficient mechanical strength. However, in some alternative embodiments (not depicted), recessed surface regions may have longitudinal overlap and still maintain sufficient mechanical strength, for example where a cladding diameter is large compared to the arc length of individual recessed surface regions (e.g., an arc length less than 75 μm for a cladding diameter over 250 μm). The number of such recessed surface regions occupying a same longitudinal length may be increased in an inverse relationship with the ratio of recess arc length/fiber diameter. Notably, spreading recessed surface regions having a given cumulative arc length over an entire circumference of a fiber within a same longitudinal length may offer greater mechanical strength than is possible for a single recessed surface region having an equivalent arc length. Stripping efficiency and/or uniformity may also be superior.

Where adjacent recessed surface regions do not overlap, longitudinal spacing S between them may vary from zero (in which case adjacent recessed surface regions may abut end-to-end) to an arbitrarily large spacing. A larger stripping rate may be achieved for a smaller average longitudinal spacing S, so an average longitudinal spacing S may be set as a function of desired stripping rate, and length of fiber available to implement the CLS.

For a single recessed surface region, one or more of arc length, recess depth, or angular position may vary as a function of longitudinal position. For example, arc length A1 may vary over longitudinal length L1. As described further below, to modulate arc length A1, a laser spot size or angle of incidence may be modulated along a scan path to form recessed surface region 150A. Similarly, recess depth D1 may vary over longitudinal length L1. For some such embodiments, a laser power may be modulated along a scan path to form recessed surface region 150A. In still other embodiments, angular position φ may vary over longitudinal length L1. For some such embodiments, fiber length 103 may be rotated about fiber axis 206 and/or a laser position may be modulated along a scan path to vary angular position φ over length L1.

In some further embodiments, for a plurality of surface regions present within a CLS, one or more of arc length, longitudinal length, recess depth, angular position, or longitudinal spacing may vary across the plurality. For example, a population of recessed surface regions may include two (or more) recessed surface regions with different arc lengths. In FIG. 2, recessed surface region 150A has an arc length A1 and recessed surface region 150A has a different arc length A2. In another embodiment, a population of recessed surface regions may include two (or more) recessed surface regions with different longitudinal lengths. In FIG. 2, recessed surface region 150A has a longitudinal length L1, recessed surface region 150B has a longitudinal length L2 that is different than length L1, and recessed surface region 150C has a longitudinal length L3 that is different than lengths L1 and L2. In still other embodiments, a population of recessed surface regions may include two (or more) recessed surface regions with different recess depths.

In another example, a population of recessed surface regions may include two (or more) recessed surface regions with different angular positions φ. Cladding light losses may be increased by increasing the number of angular positions, particularly where arc length of each recessed surface region is minimized. Adding recessed surface regions at multiple angular positions about a fiber may induce more perturbations for cladding modes, therefore increasing stripping rate (loss power/fiber length). Recess depth D, and/or device length (e.g., fiber length 103) might then be reduced depending on design requirements. In the example illustrated in FIG. 2, a first subset of recessed surface regions (e.g., 150A, 150C and 150E) are located at an angular position φ of 0°, while a second subset of recessed surface regions (e.g., 150B, 150D and 150F) are located at angular position φ of 90°. Such embodiments may, for example, induce losses in orthogonal optical modes and uniformity of losses across the modes may be improved relative to a configuration including only one of the first or second subsets of recessed surface regions. Although 90° is illustrated in FIG. 2, recessed surface regions can be positioned at any angle (e.g., 0°<φ<360°) such that the relative positions between longitudinally adjacent recessed surface regions (e.g., 150A and 150B) may also vary by any angle.

Along with multiple angular positions, recessed surface regions may be spaced apart by different longitudinal spacing. For example, in FIG. 2, recessed surface region 150A is spaced apart from recessed surface region 150B by longitudinal spacing S1, which is different than longitudinal spacing S2 between recessed surface region 150B and recessed surface region 150C. Spatial distribution of recessed surface regions may therefore vary within a CLS, and may be tuned to achieve a desired power loss and loss uniformity, for example to avoid hot spots within the CLS.

The above variations described may be implemented according to some regular (predictable) pattern within a CLS, for example according to a predetermined mathematical function (e.g., linear, monotonic, etc.). One example of a predictable pattern is shown in FIG. 2 where the recessed surface regions 150A-150F are alternated between the same two angular positions φ (e.g., 0° and 90°). Varying longitudinal length L1 through L3, etc. (e.g., increasing/decreasing) according to a predetermined function is another example of implementing a regular pattern within a CLS. However, if perturbations repeat in some form, the same subset of optical modes propagating within inner cladding 110 may experience the highest losses, while other optical modes experience considerably lower losses. Hence, to ensure all cladding modes have high losses, it may be advantageous to break cylindrical symmetry of the recessed surface regions. The parameter value variations described above may therefore also be implemented according to some irregular (unpredictable) pattern within a CLS, for example according to a probability distribution function (PDF).

In some embodiments where a CLS includes a plurality of recessed surface regions, the individual recessed surface regions differ from each other in a random manner characterized by probability distribution functions associated with the boundary and/or spatial position parameter values. For example, values of any (or all) of parameters described above, such as, arc length, longitudinal length, depth, angular position, and longitudinal spacing, may be randomized. Each parameter value characterizing the recessed surface regions may have an associated PDF (or probability mass function (PMF) if the parameter values are made discrete). In some embodiments, the PDF (PMF) for at least one of the parameters is a uniform, or normal, probability distribution function. In some further embodiments, the PDF for all of the parameters characterizing the recessed surface regions is a uniform, or normal, probability distribution function. In other embodiments, the PDF differs between two, or more, of the parameters characterizing the recessed surface regions. Random values of each parameter may be confined to within any range predetermined to be suitable for the parameter, with the PDF for each then defining the probability that that parameter assumes a particular value within the permissible range.

In some embodiments, a depth of recessed surface regions is statistically random. For example, in FIG. 2, recessed surface regions 150A-150F may have a random arrangement of different depths according to a probability distribution function (e.g., a uniform, or normal, probability distribution function), which may be confined to within some acceptable range (e.g., greater than zero and less than $R_{clad}-R_{core}$, or less than 35% of etc.). The random variation in depth may be confined to any range predetermined to be suitable with the PDF then defining the probability that the depth assumes a particular value within the permissible range. In some further embodiments, angular position of recessed surface regions is statistically random. For example, in FIG. 2, recessed surface regions 150A-150F may have a random arrangement of angular positions, for example according to a uniform probability distribution function. In some further embodiments, longitudinal spacing of recessed surface regions is statistically random. For example, in FIG. 2, recessed surface regions 150A-150F may be randomly spaced apart (i.e., longitudinal spacing S1, S2, etc. is random). In some further embodiments, arc length or longitudinal length of recessed surface regions is statistically random. For example, in FIG. 2, recessed surface regions 150A-150F may have randomized boundary dimensions (e.g., arc lengths A1, A2, etc. and longitudinal lengths L1, L2, L3, etc. are random).

Figure 3:
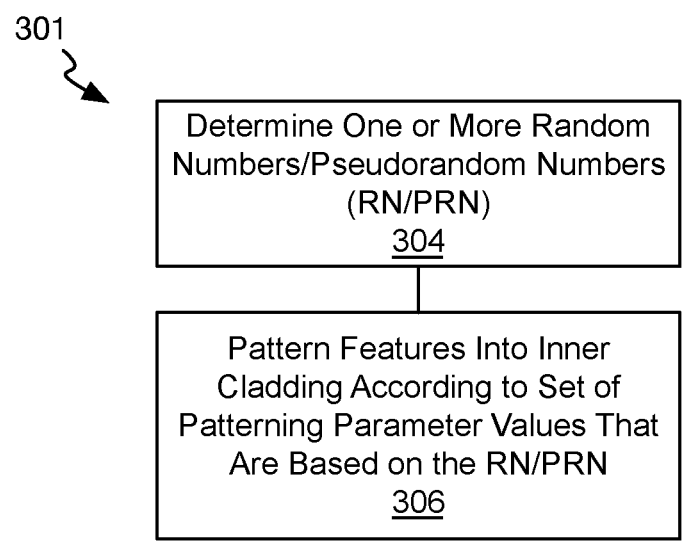
FIG. 3 is a block diagram illustrating methods of forming a CLS with multiple recessed surface regions within the CLS, in accordance with some embodiments.

FIG. 3 is a block diagram illustrating methods 301 for forming a CLS with multiple recessed surface regions within the CLS, in accordance with some embodiments. At block 304, one or more random numbers (RN) or pseudorandom numbers (PRN) are determined.

Any known randomization technique may be employed at block 304. For example, a seeded deterministic algorithm may be employed to generate a pseudorandom number according to a uniform PDF (or uniform PMF). Alternatively, a natural process that is unpredictable (e.g., atmospheric noise) may be sampled to generate a random number that may also satisfy a uniform PDF. Random values determined at block 304 may be confined to within a range predetermined to be suitable for a given parameter. In some embodiments, a randomized value for any (or all) of the parameters described above, such as, arc length, longitudinal length, depth, angular position, and longitudinal spacing, is determined at block 304 for the entire set of recessed surface regions that a CLS is to include. Where the parameters characterizing a recessed surface region are independent, a set of randomized values for each parameter may be determined.

At block 306, features are patterned into the inner cladding according to the set(s) of random numbers determined at block 304. The random numbers may be used indirectly, for example to define a control parameter of a fabrication process that is employed to pattern the set of recessed surface regions. In some exemplary embodiments where a laser is to define a recessed surface region by ablating a portion of the inner cladding, a set of the generated random values may define a set of longitudinal indexing values that will set spacing between consecutively fabricated ones in the set of recessed surface regions.

Figure 4A:
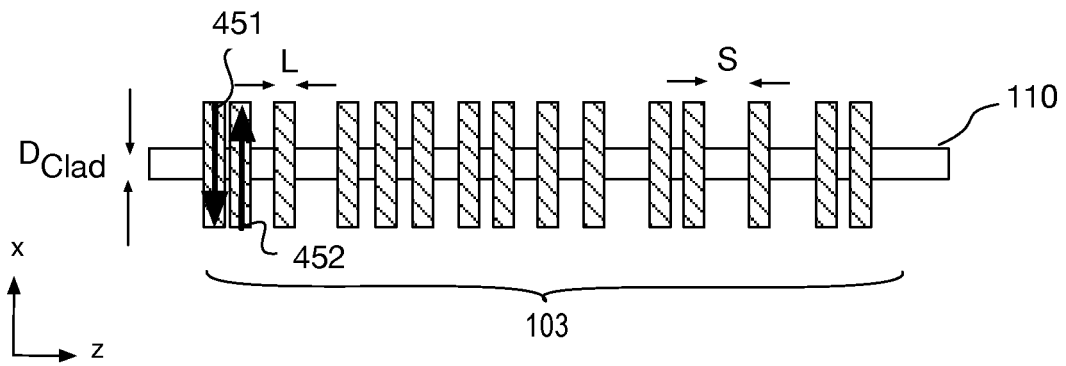
FIG. 4A is a plan view of a length of fiber within a CLS illustrating randomized spacing of recessed surface regions, in accordance with some embodiments.

FIG. 4A is a plan view of fiber length further illustrating randomized spacing of recessed surface regions, in accordance with some embodiments. As shown, a laser traverses a first scan path 451 in a first raster direction, followed by a second scan path 452 in a second (return) raster direction. Additional consecutive scan paths are further illustrated in FIG. 4A. One recessed surface region is fabricated for each scan path 451, 452, etc. In this example the scan paths are substantially orthogonal to the longitudinal axis of fiber length 103. Each scan path results in a recessed surface region that has a longitudinal length L that is dependent on laser spot size and/or angle of incidence of the beam emanating from the laser during fiber processing. For such embodiments, length L is smaller than the scan path length, which may generate recessed surface regions having an arc length that exceeds the longitudinal length. As noted above, it may be advantageous to instead have an arc length that is approximately equal to the longitudinal length, if not significantly smaller than the longitudinal length. Nevertheless, transverse scan paths are illustrated in FIG. 4A for the sake of clarity as well as to emphasize that randomization within a set of recessed surface regions does not require the recessed surface regions to have any particular boundary dimensions. Randomization of recessed surface regions may however be combined with advantageous boundary dimensions in some further embodiments.

Recessed surface regions resulting from the scan paths illustrated in FIG. 4A are spaced apart by a longitudinal spacing S that may be a function a relative displacement between fiber length 103 and a laser beam following the programmed scan paths. The parameter determining the longitudinal indexing distance between scan paths 451 and 452 may be randomized to achieve a desired randomization of longitudinal spacing S within the final set of recessed surface regions. In this example, longitudinal length L is constant over the fiber length 103 to emphasize the irregular, non-periodic longitudinal spacing S.

Figure 4B:
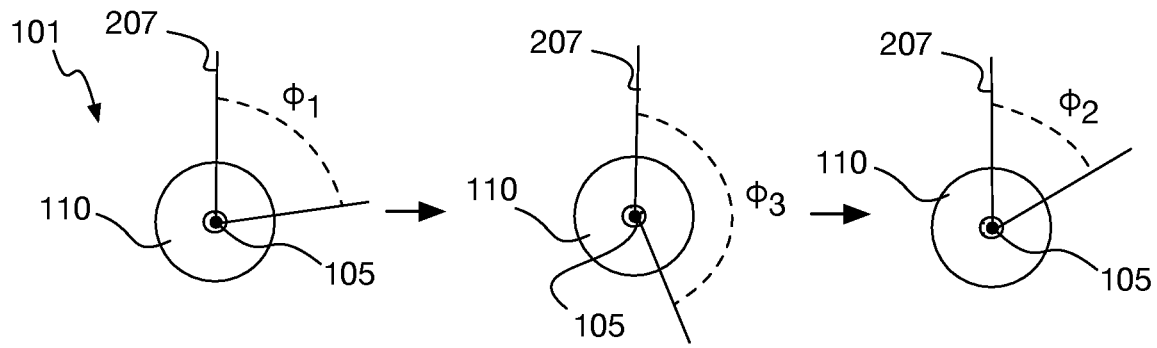
FIG. 4B is a cross-sectional view of a fiber illustrating randomized angular positions of recessed surface regions, in accordance with some embodiments.

As another example, another set of random values may define a set of angular positions about which individual recessed surface regions may be centered. FIG. 4B is a cross-sectional view of a fiber illustrating randomized angular positions of recessed surface regions, in accordance with some embodiments. Angular positions $\varphi_1$, $\varphi_2$, $\varphi_3$, etc. may be randomized over complete set of recessed surface regions of a CLS. In some exemplary embodiments where a laser is to define a recessed surface region by ablating a portion of the inner cladding, a set of the generated random values may define a set of angular position values that will define a center location of a laser beam scan path relative to an outer circumference of the inner cladding. For example, a set of the generated random values may define a set of positions of a stepper motor that is to rotate fiber length 103 about the fiber axis in concert with laser ablation of the set of recessed surface regions.

Figure 4C:
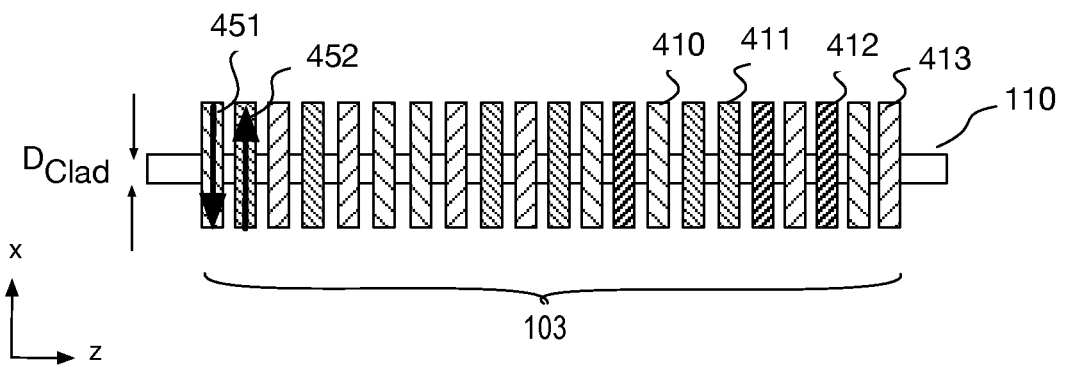
FIG. 4C is a plan view of a length of fiber within a CLS illustrating randomized depths of recessed surface regions, in accordance with some embodiments.

In some further examples where a laser is to define a recessed surface region by ablating a portion of the inner cladding, an output power of the laser may be set based on the random values. The randomized power value may then impart randomization in the recess depth across the plurality of recessed surface regions within a CLS. FIG. 4C is a plan view of a fiber length 103 illustrating randomized depths of recessed surface regions, in accordance with some embodiments. Different laser power levels are represented by the different field lines, for example associated with scan paths 410, 411, 412 and 413. In this example too, first scan path 451 is in a first raster direction, followed by second scan path 452 in a second (return) raster direction. Additional consecutive scan paths are further illustrated in FIG. 4C with the resulting recessed surface regions spaced apart by a constant longitudinal spacing S and constant longitudinal length L over the fiber length 103 to illustrate only an irregular, non-periodic variation in laser power.

As another example, another set of the generated random values may define a set of beam spot sizes and/or angles of incidence of a laser fabricating the set of recessed surface regions. Such values may, for example, vary a minimum arc length and/or longitudinal length of the set of recessed surface regions. As another example, another set of the generated random number values may define a scan path length that a laser will employ for fabricating the set of recessed surface regions. A similar randomization process may be applied to parameters of any of other known patterning techniques suitable for forming recessed surface regions to vary their boundary shape and/or spatial distribution according to a normal probability distribution function.

Returning to FIG. 3, it is noted that block 306 may be performed any number of times, for example to fabricate a plurality of CLS fiber lengths in a manufacturing line. For each length of multi-clad fiber (e.g., of the type described about in the context of fiber length 101) received, the outer cladding may be removed from at least a portion of the fiber length. In some examples, the outer cladding is removed in its entirety from a center portion of the received fiber length, while the outer cladding is retained in its entirety at end portions of the received fiber length. Recessed surface regions are then formed by ablating a portion of the inner cladding in any manner that achieves the randomized parameter values. Another length of fiber is then received, and the same process performed. Notably, once suitable parameter values have been determined at block 304, those same parameter values may be employed repeatedly for each fiber processed at block 306. Hence, randomization is at the CLS fiber level (i.e., not random across different CLS fibers).

As noted above, it may be advantageous for a recessed surface region to have a small arc length. In some such embodiments where the arc length is smaller than the longitudinal length, a single recessed surface region may be continuous from a first end of a CLS to a second end. Arc length for such a long recessed surface region may be small to maintain mechanical strength of the fiber, for example.

Figure 5:
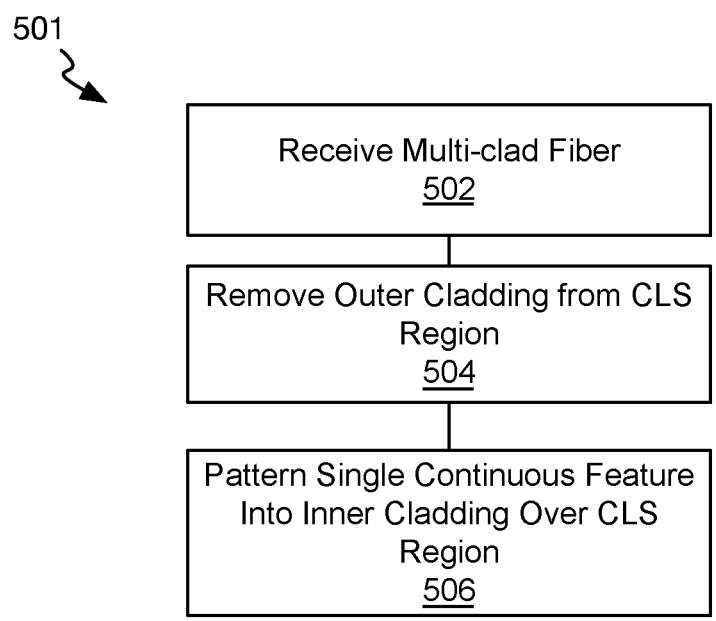
FIG. 5 is a block diagram illustrating methods of forming a CLS having a single continuous recessed surface region, in accordance with some embodiments.

FIG. 5 is a block diagram illustrating methods 501 for forming a CLS having a single continuous recessed surface region, in accordance with some embodiments. At block 502, a length of multi-clad fiber is received (e.g., of the type described in the context of fiber length 101). At block 504, the outer cladding may be removed from at least a portion of the received fiber length. In some examples, the outer cladding is removed in its entirety from a center portion of the received fiber length, while the outer cladding is retained in its entirety at end portions of the received fiber length. At block 506, a recessed surface region is then formed, for example by ablating a portion of the inner cladding along the center portion of the received fiber length. In exemplary embodiments, a single recessed surface region is formed at block 506. In other embodiments however, multiple recessed surface regions may be formed at block 506, for example at different angular positions.

Figure 6A:
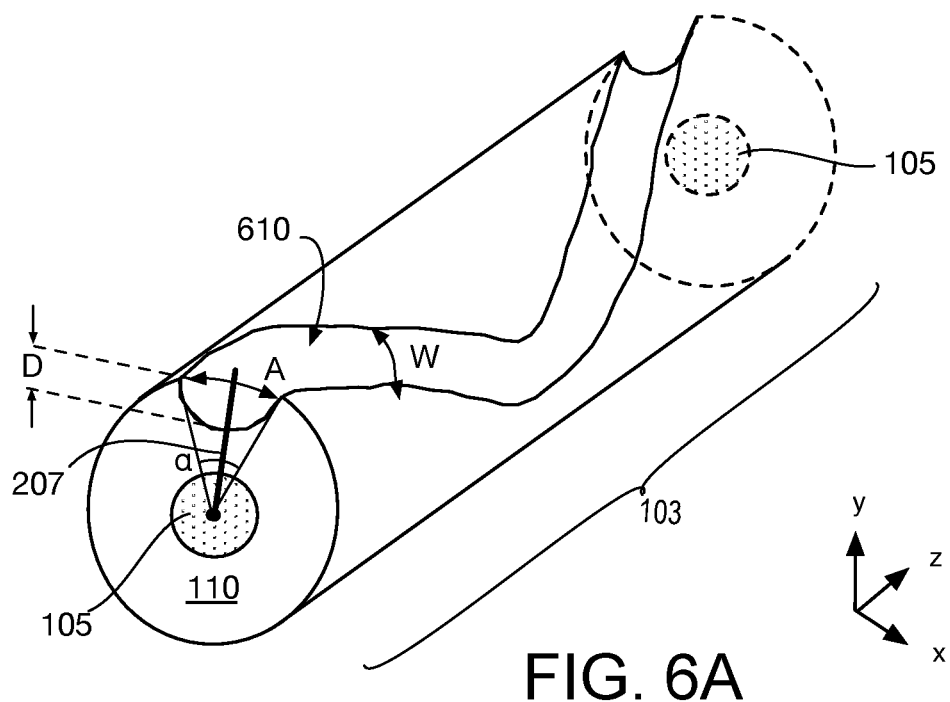
FIGS. 6A, 6B, 6C, 6D, 6E, 6F, 6G and 6H are isometric views of a length of fiber comprising a CLS, in accordance with some further embodiments.

FIG. 6A-6H are isometric views of a length of fiber within a CLS, in accordance with some further embodiments. As shown in FIG. 6A, a recessed surface region 610 is continuous over fiber length 103. The non-zero arc length A associated with a width W of the recessed surface region 610 may vary over its longitudinal length, for example according to a regular or irregular (random) pattern. Recess depth D may also vary along the longitudinal length of recessed surface region 610 according to a regular or irregular (random) pattern. The width of recessed surface region 610 may deviate from arc length A as a function of the path of recessed surface region 610. For example, where the path is purely longitudinal (i.e., recessed surface region 610 a straight flute), recessed surface region 610 has a width that is equal to arc length A. Where the path traverses the circumference of inner cladding 110, recessed surface region 610 may have a width significantly small than arc length A. Recess depth D is non-zero such that there is no fully cylindrical inner cladding along fiber length 103. Angular position may likewise vary along the longitudinal length of recessed surface region 610 according to an irregular (random) path pattern, as shown in FIG. 6A, or according to a regular path pattern, such as the spiral or helical groove or flute shown in FIG. 6B.

A laser source may be employed to ablate cladding material and form recessed surface region 610. Width W of recessed surface region 610 may be controlled primarily by spot size of the laser source, and secondarily controlled by the amount of laser energy coupled into inner cladding 110 during ablation. Depth D of recessed surface region 610 may be controlled primarily by the amount of laser energy coupled into inner cladding 110 during ablation, which is a function of at least laser power, pulse length, number of pulses, or a pulse overlap ratio. In some embodiments, depth is varied along the longitudinal length of recessed surface region 610 by adjusting the overlap of pulses so that the depth has a "ripple" shape along the helix. Fiber length 103 occupied by the CLS structure may be controlled by combining the ablation time and rate of linear displacement (speed). In some helical CLS embodiments, a laser may be scanned at a longitudinal rate while the fiber is rotated about its axis. Alternatively, a fiber may be displaced longitudinally along the fiber axis while the laser source is rotated about the fiber axis.

Figure 6B:
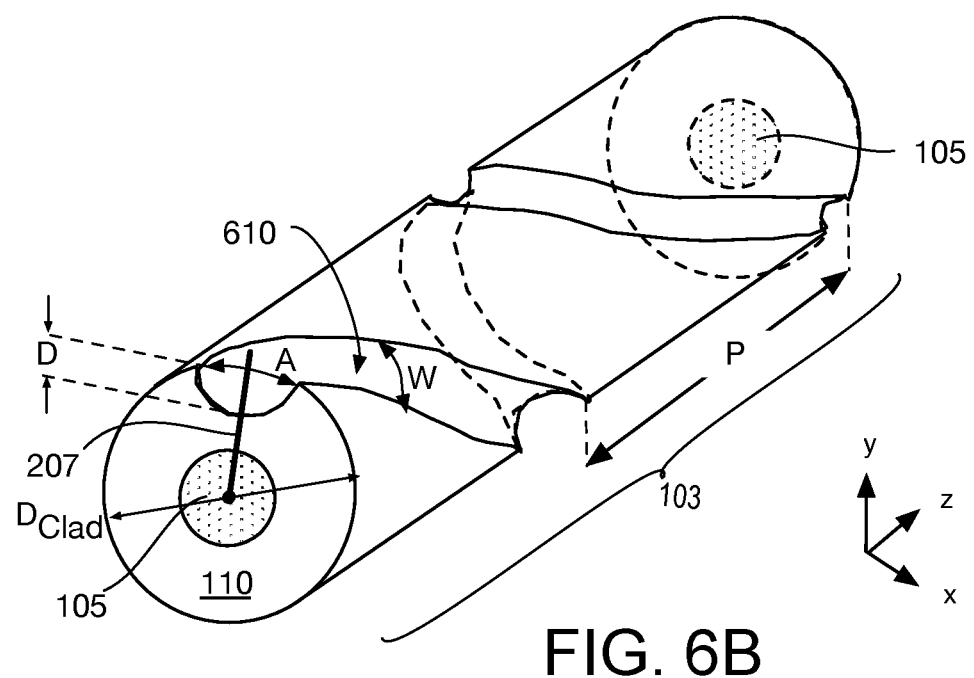

As shown in FIG. 6B, within CLS fiber length 103, a helical section of cladding shaped like a corkscrew has been removed for at least a full 360° about the fiber axis. For embodiments with one or more helical grooves, each groove has a transverse width W, and each groove may span the outer circumference of inner cladding 110 according to a helical function centered about the fiber axis that results in the groove having an arc length A at its intersection with a transverse plane of the fiber. Dimensions of each groove or flute, as well as the groove count, and groove pitch may all be optimized to achieve certain CLS performance requirements, such as a peak temperature, and/or stripping rate (e.g., some dB/unit length), and/or stripping efficiency (e.g., some threshold dB level for the CLS), and/or fiber strength. Hence, there are many degrees of freedom in a helical groove design that can ensure a CLS has sufficient mechanical strength to support itself while still stripping the intended light, at the intended location, in the smallest form factor.

A helical groove may have advantages over a notch (e.g., one having a longest length transverse to the fiber axis) because the helical groove can continuously strip cladding light over its entire longitudinal length, allowing for shorter, more efficient clad light strippers while limiting the transverse fiber dimension of the groove to only the arc length A. Similar to the lead of a screw, the pitch P of the helical structure illustrated in FIG. 6B defines the number of helical grooves within fiber length 103. Hence, pitch P, in addition to helicity (handedness), groove depth D and width W may all be determined to achieve a desired stripping efficiency/fiber length. The helix pitch P may be significantly larger than the length of the CLS structure so that the number of turns within the length of a CLS structure is less than 1 (e.g., ¼ turn, ½ turn, ¾ turn, etc.). The helix pitch P may also be substantially equal to the length of the CLS structure so that there is approximately one full turn in the helix over the length of the CLS. In the embodiment illustrated in FIG. 6B, the helix pitch P associated with one complete turn of the helical groove less than the fiber length 103 with almost 1.5 turns being shown. Pitch P may be controlled during CLS fabrication, for example, through control of linear and rotational speeds. A multiple of time per full rotation and linear speed may be varied over fiber length 103 if pitch P is to be varied.

Figure 6C:
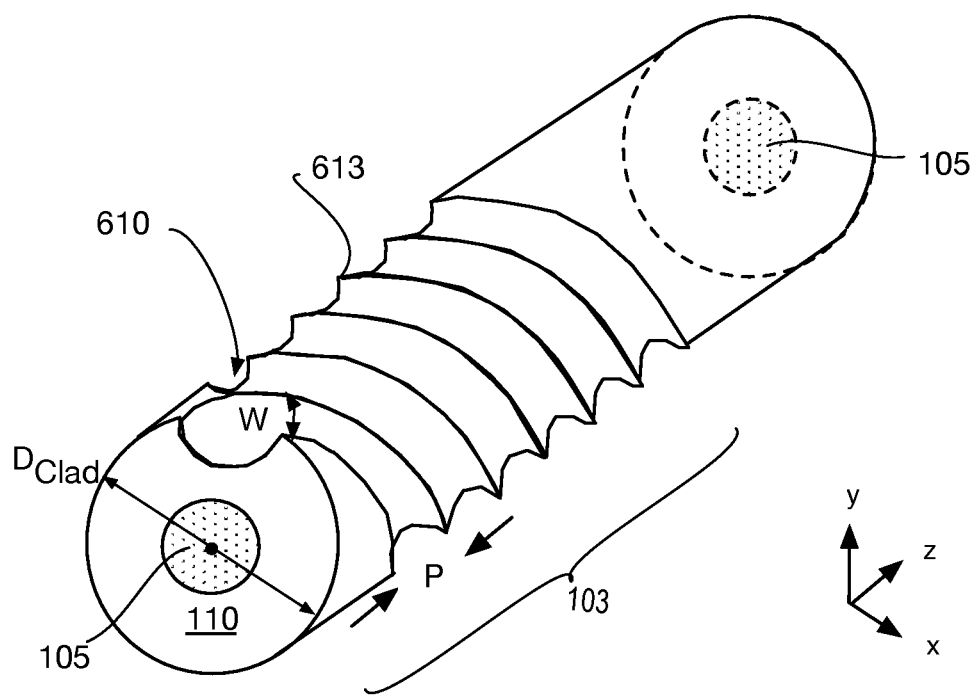

In some embodiments, the helix pitch P is significantly shorter than the length of the CLS structure so that the number of turns within the length of a CLS structure is significantly more than one (e.g., 3 turns, 5 turns, 10 turns, etc.). In FIG. 6C, helix pitch P is approximately $\frac{1}{6}^{th}$ the CLS fiber length 103 such that there are 6 full turns. Notably, helix pitch P may be smaller than groove width W such that within fiber length 103 there is no portion of fiber that has the full cladding diameter $D_{Clad}$. Instead, there is a helical ridge 613 that has some less diameter less than $D_{Clad}$, which depends on groove width W, groove depth D, and helix pitch P.

Figure 6D:
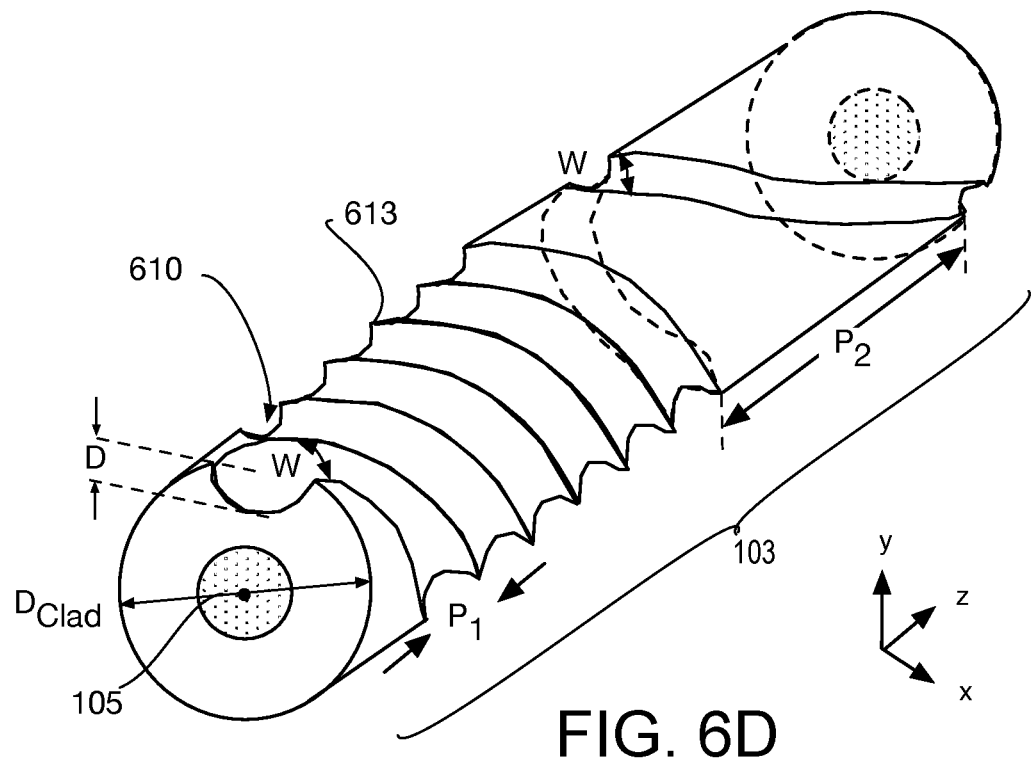

In some further embodiments, at least one of the pitch P, the groove depth D, and/or groove width W varies along the length of the helical groove. For example, depth D, and/or groove width W may increase monotonically with distance from one end of the CLS (e.g., proximal to a cladding light source end of a fiber system). FIG. 6D illustrates an example, where recessed surface region 610 follows a helical path with a first pitch $P_1$ over a first portion of fiber length 103 and then follows a helical path with a second, larger, pitch $P_2$ over a second portion of fiber length 103. Assuming groove depth D and groove width W are constant over fiber length 103, the smaller pitch $P_1$ can be expected to have a higher stripping rate than the larger pitch $P_2$. The second portion with pitch $P_2$ might therefore be placed proximal to a source of cladding light. In other embodiments, groove width W and/or groove depth D may also be varied along with groove pitch.

Figure 6E:
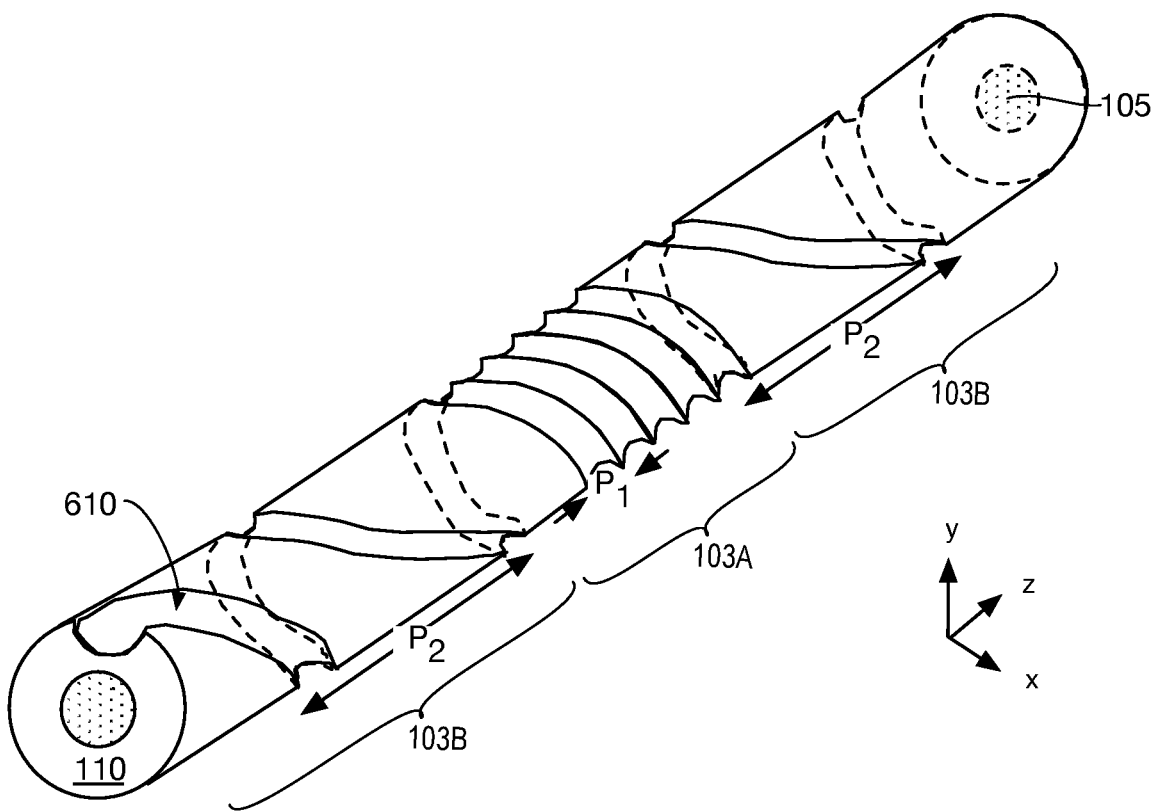

A helical groove structure may also be symmetrical over its length with a parameter of the groove varying from a center of the CLS structure to opposite ends of the CLS structure according to substantially the same function. For example, groove pitch P, groove depth D, and/or groove width W may each increase or decrease with proximity to each end of the CLS. As noted above, it can be advantageous to spread heat associated with dissipated cladding light out over a longer length of fiber. Such spreading may be readily achieved with a CLS comprising one or more helical structures. For example, a first helical structure with low stripping efficiency can remove a portion, but not all the cladding light. Then another helical structure with higher efficiency can follow, and this pattern can continue for one or more sections as needed to achieve a target total stripping efficiency. Because helical structures have the ability to achieve high stripping efficiency, the overall CLS fiber length can remain small, but with better heat spreading possible by varying sections between higher and lower efficiency. FIG. 6E is an illustration of a helical structure where a helical recessed surface region 610 has a larger helix pitch $P_2$ within two end fiber lengths 103B that are on opposite sides of a center fiber length 103A in which the recessed surface region 610 has a smaller helix pitch $P_1$. This configuration may, for example, reduce the stripping rate within the end fiber lengths 103B where cladding light first enters the CLS. Heating over the CLS may therefore be spread over fiber lengths 103A 103B. Alternative configurations, for example where two end portions with a smaller pitch (e.g., $P_1$) are on opposite sides of a center portion having a larger groove pitch (e.g., $P_2$) are also possible as there may be many sections of alternating efficiency spanning a CLS fiber length.

Although one helical groove is illustrated in FIG. 6B-6E, a CLS may include two or more helical grooves. A CLS comprising multiple helical structures may further enable optimization of the CLS to meet performance requirements while maximizing fiber strength for reliability. Using multiple helical structures is also advantageous for design and manufacturing as each helical groove can be characterized individually for performance characteristics, and combined to tailor the CLS to specific application requirements. Each of the plurality of helical structures may have different start and end points, and there may be any number of helical structures with 2-5 helices being an exemplary range for a 100-180 µm diameter cladding. Multiple helical structures can be separated by a longitudinal distance along the fiber axis, or can be separated angularly about the fiber axis (e.g., with multiple helical structures about the same length of fiber). A plurality of helical grooves may be either congruent or intersecting. The handedness may also differ across a plurality of helical structures within a CLS.

Figure 6F:
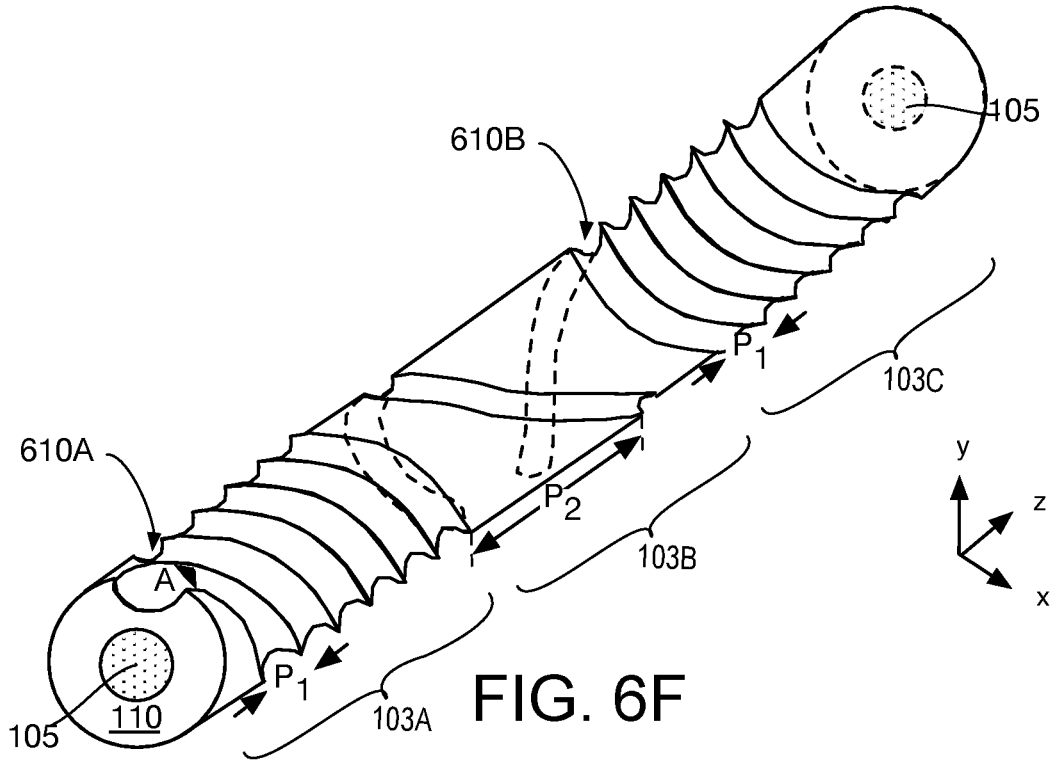

FIG. 6F illustrates an exemplary CLS fiber structure that includes a first recessed surface region 610A that varies from a first helix pitch $P_1$ within fiber length 103A to a second helix pitch $P_2$ within an adjacent fiber length 103B. The CLS fiber structure further includes a second recessed surface region 610B that also varies from helix pitch $P_1$ within fiber length 103C to the second helix pitch $P_2$ within the adjacent fiber length 103B. As shown, recessed surface region 610A has a first handedness (e.g., turning right down the z-axis with increasing proximity to fiber length 103B from a first end) while recessed surface region 610B has a second handedness (e.g., turning right down the z-axis with increasing proximity to fiber length 103B from a second end). Within fiber length 103B there are therefore two helical recessed surface regions 610A and 610B located at different angular positions about the fiber axis. The example in FIG. 6F is therefore symmetrical about a transverse plane within fiber length 103B.

Figure 6G:
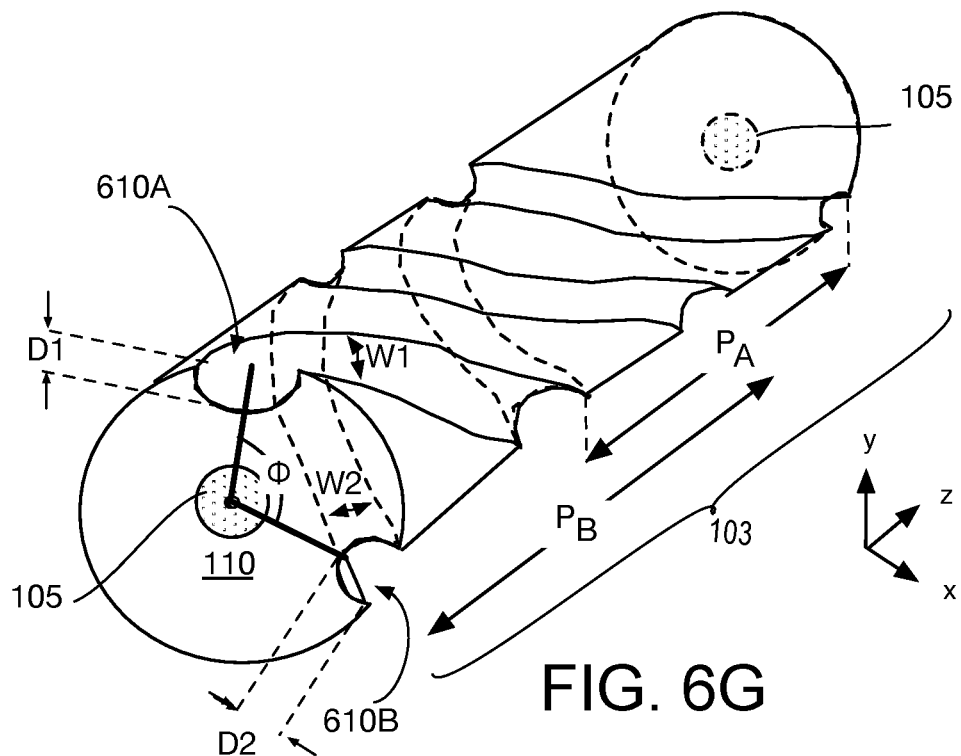

FIG. 6G illustrates an exemplary CLS fiber structure that includes a plurality of helical recessed surface regions 610A and 610B, which are separated by an angular separation angle φ. Recessed surface region 610A has a helix pitch $P_A$ and recessed surface region 610B has a helix pitch $P_B$. In some embodiments, helical pitches $P_A$ and $P_B$ may be substantially equal so that the helical patterns are congruent with angle φ being constant over CLS fiber length 103. In some alternative embodiments, helical pitches $P_A$ and $P_B$ differ, and angle φ varies over CLS fiber length 103. Either one, or both, of helical pitches $P_A$ and $P_B$ may be varied over fiber length 103. Either one, or both, of helical pitches $P_A$ and $P_B$ may also be varied over fiber length 103. Recessed surface region 610A has a groove depth $D_1$ and groove width $W_1$, that may vary, or be constant, over fiber length 103. Recessed surface region 610B likewise has a groove depth $D_2$ and groove width $W_2$, that may vary, or be constant, over fiber length 103. Groove depths $D_1$, $D_2$ and groove widths $W_1$, $W_2$ may all be turned independently.

Figure 6H:
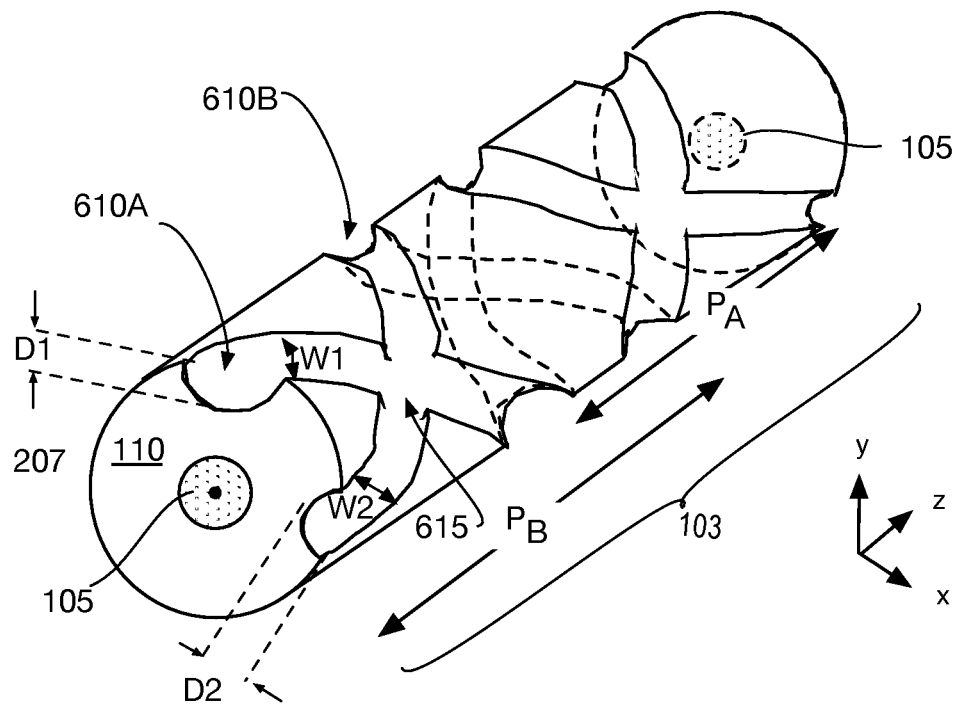
Figure 7:
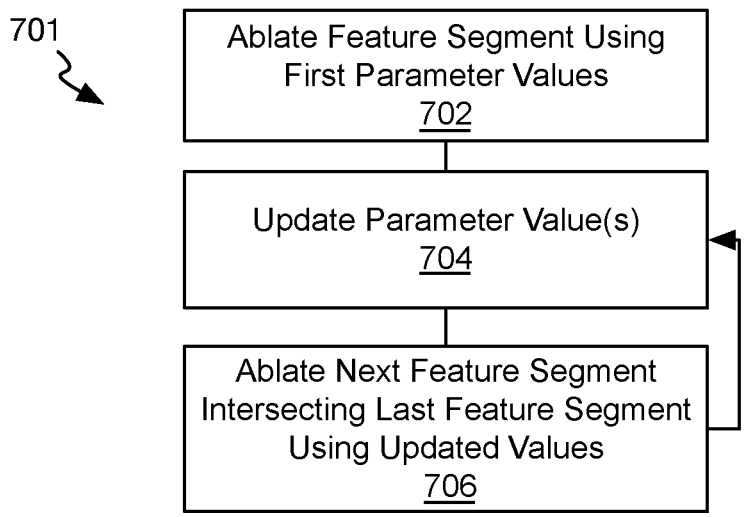
FIG. 7 is a block diagram illustrating methods of forming a CLS having an end-to-end segmented recessed surface region in a cladding layer, in accordance with some embodiments.

FIG. 6H illustrates an exemplary CLS fiber structure that includes a plurality of helical recessed surface regions 610A and 610B having opposing handedness. As shown, the helical structures cross each other at an intersection 615. Such intersections may be points of higher stripping rate such that the density of intersections 615 within a CLS structure may also be a design parameter that can be optimized. Depending on the techniques employed to fabricate recessed surface regions 610A and 610B, groove depth D may be greater within an intersection 615. The lateral dimensions, as well as the density, of intersections 615 may be controlled by the groove depths $D_1$, $D_2$, groove widths $W_1$, $W_2$ and helical pitches $P_A$ and $P_B$.

Where one or more parameter values vary along the longitudinal length of a continuous recessed surface region, the recessed surface region may be composed of a plurality of segments abutted end to end with the one or more parameter values varied from one segment to the next. FIG. 7 is a block diagram illustrating methods 701 for forming a CLS having end-to-end segmented surface regions, in accordance with some embodiments. In methods 701, at block 702 a fiber processing system (e.g., including a laser processing head) ablates a recessed surface region segment into the inner cladding using a first set of parameter values. At block 704, the fiber processing system parameter values are updated, for example either according to a predetermined predictable (i.e., mathematical) function, or according to an unpredictable (i.e., random) function. At block 706, the fiber processing system ablates a second recessed surface region segment into the inner cladding using the updated set of parameter values. Between blocks 702 and 706, the fiber may be displaced relative to the laser of the fiber processing system by an amount that ensures the first and second segments abut.

Figure 8A:
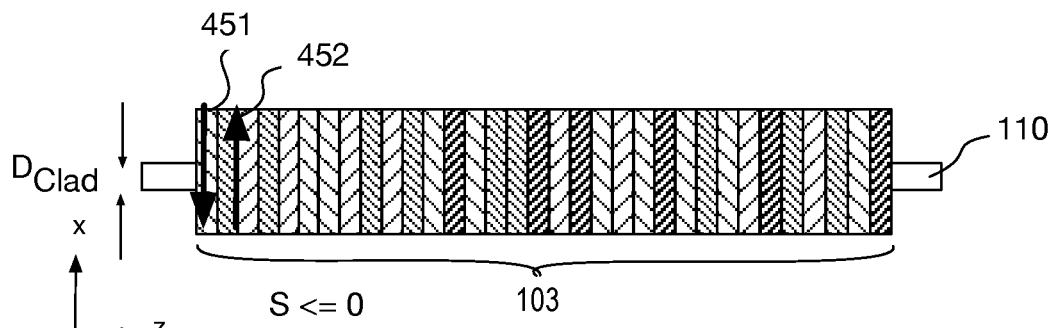
FIG. 8A is a plan view of a length of fiber within a CLS illustrating end-to-end segmentation of a recessed surface region, in accordance with some embodiments.

The segments may be fabricated separately, for example each segment may be patterned into the inner cladding with a discrete raster scan of a laser. Each scan may abut the next. Alternatively, a laser may follow a single scan path and properties of the laser process modulated during the single scan (e.g., that follows a predetermined path defined by angular position and longitudinal position according to a helical function or other continuous function). FIG. 8A is a plan view of fiber length 103 illustrating end-to-end segmentation of a recessed surface region, in accordance with some embodiments. As shown, a longitudinal indexing between laser beam scan paths 451 and 452 is such that scan paths 451 and 452 ablate two abutting recessed surface region segments (i.e., longitudinal spacing S is no more than zero). As described above in the context of FIG. 4C, different filed lines represent different laser output power levels employed at some point within the scan path.

Figure 8B:
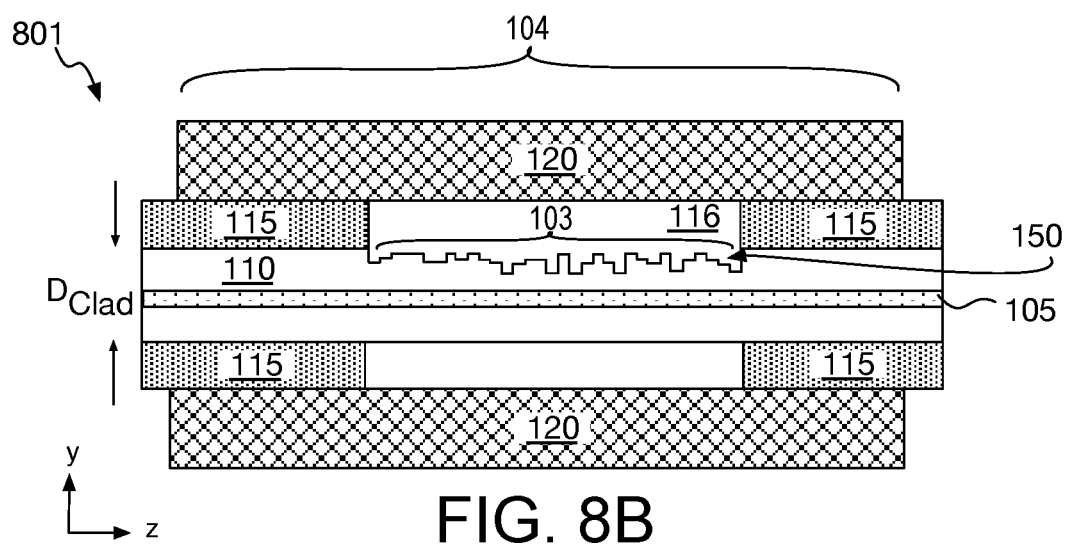
FIG. 8B is a cross-sectional view of a CLS with end-to-end segmentation of a recessed surface region, in accordance with some embodiments.

FIG. 8B is a cross-sectional view of CLS 801 that includes the components introduced above in the context of FIG. 1C. CLS 801 however further illustrates recessed surface region 150 that extends the entirety of fiber length 103 and segments within recessed surface region 150 all have non-zero recess depths that vary between the segments. Such depth variation may induce mode mixing and/or losses along the entire length of a recessed surface region. In the illustrated example, there is an irregular or random pattern of non-zero recess depths. Such randomization may be implemented substantially as described elsewhere herein. In other embodiments, there may be a regular pattern to the variation.

Figure 9A:
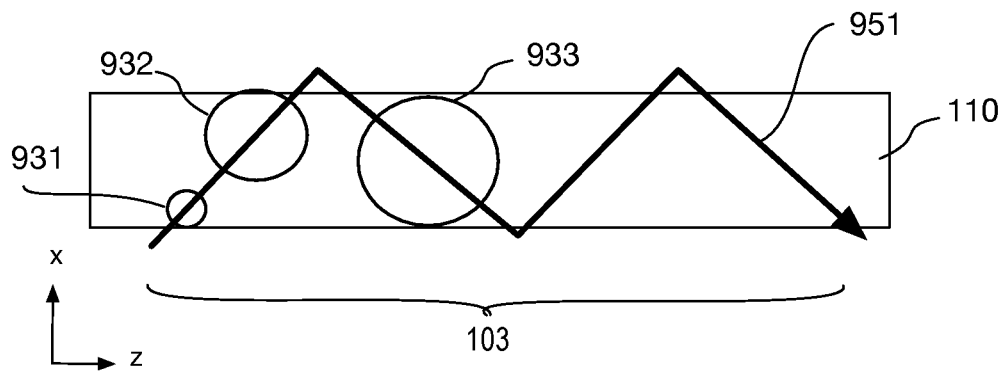
FIGS. 9A and 9B are plan views of a fiber illustrating spot sizes and raster paths for forming a continuous recessed surface region in a cladding layer, in accordance with some embodiments.
Figure 9B:
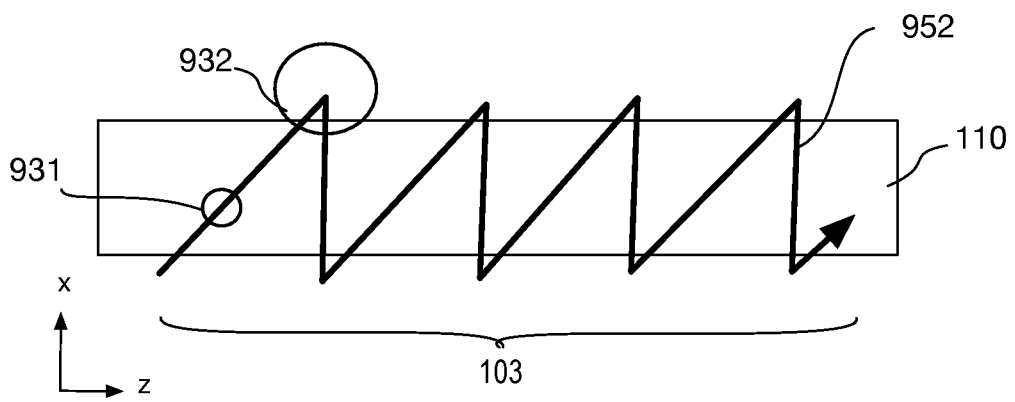

FIGS. 9A and 9B are plan views of inner cladding 110 illustrating spot sizes 931, 932 and 933 and raster paths 951 and 952 suitable for forming a continuous recessed surface region in a cladding layer, in accordance with some embodiments. As shown in FIG. 9A, scan path 951 is a zig-zag pattern with x-z vector motion. Depending on the spot size, both arc length and angular position of a resulting recessed surface region may be modulated. For example, for spot size 931, ablating along scan path 951 may generate a continuous recessed surface region that spans substantially the entire transverse width of inner cladding 110. For the larger spot size 933 that is approximately equal to the diameter of inner cladding 110, following ablating along scan path 951 may generate a continuous recessed surface region that only periodically spares some portion of the transverse width, with the remaining arc length recessed to some depth that may vary if laser output power is modulated at points along scan path 951. FIG. 9B illustrates a saw-tooth scan pattern having a shorter period.

Figure 10:
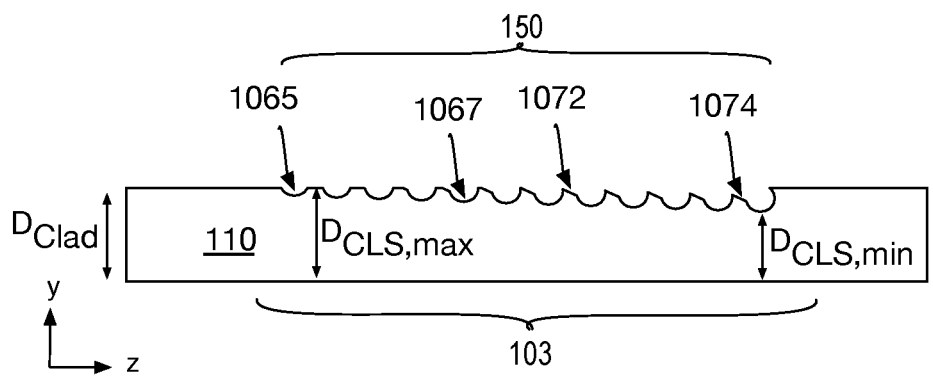
FIG. 10 is a cross-sectional view of a length of fiber within a CLS illustrating a recessed surface region with continuous depth modulation, in accordance with some embodiments.

FIG. 10 is a cross-sectional view of a length of fiber within a CLS illustrating a recessed surface region 150 that has continuous depth modulation, in accordance with some embodiments. With continuous depth modulation, disturbances along fiber length 103 may induce mode mixing and/or losses along the entire length of a recessed surface region. In the illustrated example, in addition to the entire recessed surface region 150 being recessed from the nominal outer diameter of the inner cladding ($D_{clad}$), there is a regular progression in recess depth over fiber length 103 with periodic troughs (e.g., 1065 and 1067) that become deeper (relative to a nominal cylindrical surface of inner cladding 110 corresponding to $D_{clad}$) over the fiber length 103. Recessed surface region 150 further comprises periodic ridges (e.g., 1072 and 1074) that also become deeper (e.g., relative to $D_{clad}$) over fiber length 103. In the illustrated example, even the tallest of the periodic ridges within recessed surface region 150 represents a reduction in cladding diameter ($D_{CLS}$) from cladding diameter $D_{clad}$. The local variations in depth may be the result of discrete laser ablation events, each associated with a separate segment, for example. The global variations in depth may be the result of an increase in laser output power for successive segments, for example.

Figure 11:
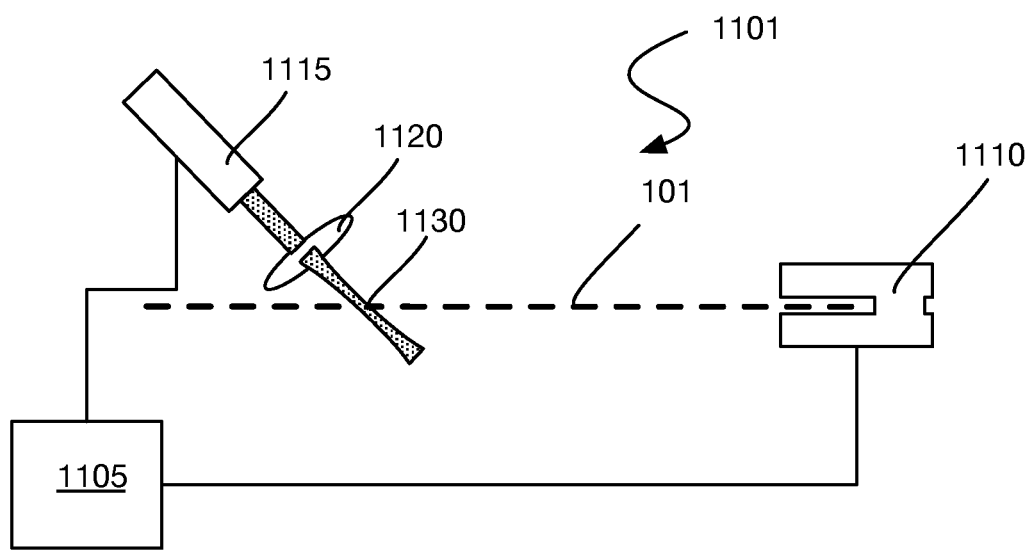
FIG. 11 is a schematic of a laser fiber processor operable to fabricate a CLS fiber, in accordance with some embodiments.

As noted above, recessed surface regions of a CLS may be patterned into a cladding layer by laser ablation of some of the cladding material. FIG. 11 is a schematic of a laser fiber processor (processing system) 1101, which is operable to fabricate a CLS, in accordance with some embodiments. Processing system 1101 includes a laser 1115. Laser 1115 in some exemplary embodiments is a $CO_2$ laser, which emits at wavelengths that are absorbed by cladding material (e.g., silica glass). Laser 1115 may for example, operate wavelength locked at 10.6 µm, or 9.6 µm at a peak pulse intensity suitable for elevating the temperature of an irradiated zone to the evaporation temperature of the cladding.

Laser 1115 outputs through a delivery fiber, which in some embodiments further includes a beam conditioner 1120. Beam conditioner 1120 may include free-space optics and/or fiber optics for focusing, for example. In some embodiments, beam conditioner 1120 comprises one or more lenses comprising a material of suitable index, such as ZnSe. Exiting the lens, the light beam may focus to a spherical or aspherical spot size 1130 at some working distance. Spot size 1130 may vary with implementation. For example, a larger spot size (e.g., arrived at through defocusing optics) of 250 µm, or more, may generate large, smooth features that can be expected to maintain high mechanical strength of the fiber. Spot size 1130 may alternatively be significantly smaller than the inner cladding diameter of a fiber. For example, spot size 1130 may be significantly less than 100 µm, less than 75 µm, and even no more than 50 µm. Notably, the width of a recess formed by a laser of a given spot size may be significantly smaller than the spot diameter. For example, a spot size of over 200 µm may render a recess of less than 100 µm in diameter. At this smaller size, the spot may be significantly smaller than the outer diameter of an inner cladding, which may be 125-660 µm, for example.

Processing system 1101 further includes a motorized translation and/or rotation stage 1110. Stage 1110 operable for linear translation in three axes (x,y,z), tiltable in the plane of incidence of the laser, and rotatable about an axis of fiber 101 (drawn in dashed line in FIG. 11 as the fiber is only a workpiece of processing system 1101 and not part of the processing system 1101). Processing system 1101 further comprises a computer controller 1105 communicatively coupled to laser 1115 and to stage 1110. Computer controller 1105 is operable to control laser 1115 and stage 1110 in concert to ablate any predetermined regions of a workpiece (e.g., fiber 101).

As noted above in the context of some exemplary fiber processing methods, a recessed surface region may be patterned at a desired location and with desired boundary dimensions by irradiating a portion of the cladding with one or more laser pulses. The stage (or laser) may then be indexed to a next power, the beam refocused on another location of the fiber to pattern the next recessed surface region.

Figure 12:
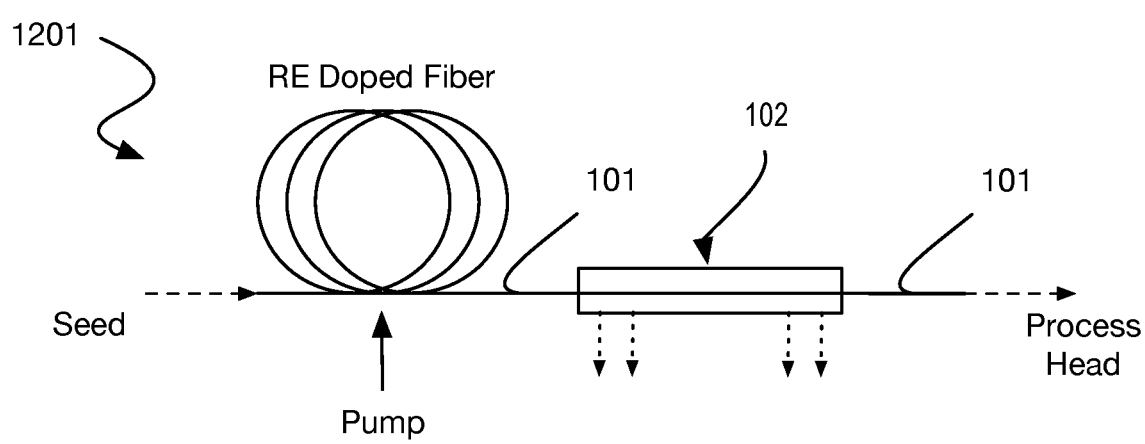
FIG. 12 is a schematic of a material processing fiber laser system including a CLS, in accordance with some embodiments.

FIG. 12 is a schematic of a multimode fiber laser processing system 1201 according to some embodiments. In FIG. 12, system 1201 includes a fiber 101 that includes an active length. A seed light source is coupled to fiber 101, for example at an input coupler. The seed light source may be, for example, a diode pumped solid-state laser, a quantum cascade laser, a passively q-switched laser, a diode laser, a mode-locked laser, a fiber laser, or a combination thereof. The seed light source may be operable for any of continuous wave output, pulsed output, or a wavelength chirped pulsed output, for example. As one specific example, the seed light source is a Nd:YAG laser.

Within the active length of fiber 101, rare-earth dopant(s) are present. For example, such dopants may be within a core of the fiber, resulting in an optical gain spectrum that at least partially overlaps the spectrum of the seed light source. For example, Ytterbium may be used as a rare-earth dopant suitable for a seed laser source including wavelengths between 1030 nm and 1090 nm. In other embodiments, other rare-earth dopants can be used. In some exemplary embodiments, fiber 101 is a double clad fiber where the seed light is amplified in the core by pump light that is propagated within an inner cladding surrounding the core. The optical pump has an output spectrum that at least partially overlaps the absorption spectrum of active length of fiber 101. For example, where Ytterbium is chosen as the rare-earth dopant, the optical pump may be a fiber-coupled laser diode operable to emit near 976 nanometers. The output from optical pump source may be optically coupled to the active length of fiber 101 with any known pump combiner. The pump may be operable in a counter-propagating configuration, or may be introduced upstream of the active length of fiber 101 such that light from the seed light source and the pump light are co-propagating within the active length of fiber 101, for example.

In exemplary embodiments, fiber 101 includes CLS 102, which is further coupled to another length of fiber 101 (e.g., double-clad fiber) operable as a delivery fiber. The delivery fiber may be further coupled to a process head, for example. In accordance with some embodiments, CLS 102 may have one or more of the features described elsewhere herein. Downstream of CLS 102 is a delivery fiber, which in the illustrated example includes a process head. Output power at the delivery fiber may vary, for example from 500 W to 3 KW.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure. It will be recognized that the invention is not limited to the embodiments so described, but can be practiced with modification and alteration without departing from the scope of the appended claims.

In first examples, an optical fiber apparatus comprises first and second lengths of fiber, each comprising an outer cladding over an inner cladding that is over a core. The apparatus comprises a cladding light stripper (CLS) comprising a third length of fiber optically coupling the first length of fiber to the second length of fiber. The third length of fiber further comprises a core, and an inner cladding that has one or more surface regions recessed from a nominal cladding diameter to perturb light propagating in the inner cladding. Individual ones of the recessed surface regions have a longitudinal length that exceeds an arc length of the regions, and a depth that varies over the longitudinal length.

In second examples, for any of the first examples adjacent ones of the recessed surface regions abut, end to end, and wherein one or more dimensions, or angular position about an axis of the third length of fiber, vary.

In third examples, for any of the first through second examples a depth of adjacent ones of the recessed surface regions vary over the third length of fiber.

In fourth examples, for any of the third examples the depth is statistically random within the plurality of recessed surface regions.

In fifth examples, for any of the second examples the angular position varies over the longitudinal length.

In sixth examples, for any of the first through fifth examples, the apparatus comprises a heat sink adjacent to the third length of fiber, the heat sink comprising a material absorbing of light that is to escape at the recessed surface regions, and dissipating of heat produced by the absorbing of the light.

In seventh examples, for any of the sixth examples adjacent ones of the recessed surface regions abut, end to end, over at least a majority of the third length of fiber.

In eighth examples for any of the first through seventh examples the recessed surface regions comprise a first set of recessed surface regions at a first angular position about the fiber axis, and a second set of recessed surface regions at a second angular position. Individual ones of the second set are positioned longitudinally between individual ones of the first set with no overlap between the adjacent ones of the first and second sets.

In ninth examples, for any of the first through eighth examples the core of first, second and third lengths of fiber has a first diameter, the inner cladding of the first and second lengths of fiber both have the same cladding diameter, and the third length of fiber lacks an outer cladding at least within the recessed surface regions.

In tenth examples, a fiber laser system comprises a source laser, a pump laser, and a first length of fiber. The first length of fiber has a core coupled to the source laser and surrounded by two or more cladding layers, and wherein a first of the cladding layers is coupled to the pump laser. The system comprises a second length of fiber. The second length of fiber has a core surrounded by two or more cladding layers. The system comprises a cladding light stripper (CLS) comprising a third length of fiber optically coupling the first length of fiber to the second length of fiber. The third length of fiber further comprises a core, and an inner cladding that has one or more surface regions recessed from a nominal cladding diameter to perturb light propagating in the inner cladding. Individual ones of the recessed surface regions have a longitudinal length that exceeds a transverse width of the regions, and a depth that varies over the longitudinal length.

In eleventh examples, for any of the tenth example, adjacent ones of the recessed surface regions abut, end to end, and wherein a depth of adjacent ones of the recessed surface regions vary over the third length of fiber.

In twelfth examples, for any of the tenth through eleventh examples the laser system has a power output of at least 500 W.

In thirteenth examples, an optical fiber apparatus comprises first and second lengths of fiber, each comprising an outer cladding over an inner cladding that is over a core. The apparatus comprises a cladding light stripper (CLS) comprising a third length of fiber optically coupling the first length of fiber to the second length of fiber, wherein the third length of fiber further comprises a core, and an inner cladding that has one or more helical grooves to perturb light propagating in the inner cladding.

In fourteenth examples, for any of the thirteenth examples the one or more helical grooves have a depth, width, or a helix pitch that varies over the third length.

In fifteenth examples, for any of the thirteenth through fourteenth examples the one or more helical grooves extend continuously over the third length, and individual ones of the grooves have a helix pitch that is shorter than the third length.

In sixteenth examples, for any of the thirteenth through fifteenth examples the one or more helical grooves make two or more turns about a fiber axis over the third length.

In seventeenth examples, for any of the thirteenth through sixteenth examples the one or more helical grooves comprise a single helical groove.

In eighteenth examples, for any of the thirteenth through seventeenth examples the one or more helical grooves comprise two or more helical grooves spaced apart longitudinally or angularly.

In nineteenth examples, for any of the eighteenth examples, the two or more helical grooves intersect each other.

In twentieth examples, for any of the nineteenth examples, the two or more helical grooves have opposing handedness.

In twenty-first examples, a method of forming an optical fiber apparatus comprises receiving an optical fiber comprising a first length of fiber separated from a second length of fiber by a third length of fiber, each of the lengths of fiber comprising an outer cladding over an inner cladding that is over a core. The method comprises removing the outer cladding from at least a portion of the third length of the fiber. The method comprises recessing one or more surface regions of the inner cladding within the portion of the third length of the fiber by focusing a laser beam spot on an outer surface of the inner cladding. The recessing comprises displacing the fiber relative to the laser beam longitudinally along a length of the fiber that exceeds a transverse width of the beam spot, and wherein the recessing comprises varying a power of the beam during the displacing.

In twenty-second examples, for any of the twenty-first examples the method further comprises varying an angle of incidence of the laser relative to the outer surface of the inner cladding during the displacing.

In twenty-third examples, for any of the twenty-first through twenty-second examples the method further comprises varying an angular position of the laser beam relative to a longitudinal axis of the fiber during the displacing.

In twenty-fourth examples, for any of the twenty-third examples the varying of the angular position is according to a helical function.

In twenty-fifth examples, for any of the twenty-third through twenty-fourth examples the varying of the angular position or the angle of incidence is according to a probability distribution function.

In twenty-sixth examples, for any of the twenty-first examples varying a power of the beam during the displacing further comprises indexing the beam to a first location on the fiber, ablating a first portion of the inner cladding to a first depth with a first beam power, indexing the position of beam to a second location on the fiber spaced apart from the first location by a distance no more than a spot size of the focused beam, and ablating a second portion of the inner cladding to a second depth with a second beam power.

In twenty-seventh examples, for any of the twenty-sixth examples the method further comprises selecting the first beam power and the second beam power based on a random number sampled according to a uniform probability distribution (PDF).

In twenty-eighth examples, for any of the twenty-first through twenty-seventh examples a $CO_2$ laser is used to generate the laser beam.

In twenty-ninth examples, for any of the twenty-first through twenty-eighth examples displacing the fiber relative to the laser beam further comprises displacing the fiber relative to the laser beam by at least the third length of the fiber.

The above embodiments may include the undertaking of only a subset of such features, undertaking a different order of such features, undertaking a different combination of such features, and/or undertaking additional features than those features explicitly listed. Therefore, the scope of the invention should be determined with reference to the appended claims, along with the full scope of equivalents to which such claims are entitled.

What is claimed is:

1. An optical fiber apparatus, comprising: first and second lengths of fiber, each comprising an outer cladding over an inner cladding that is over a core; and a cladding light stripper (CLS) comprising a third length of fiber optically coupling the first length of fiber to the second length of fiber, wherein the third length of fiber further comprises a core and an inner cladding that has one or more helical grooves to perturb light propagating in the inner cladding, wherein the one or more helical grooves have a central portion between two outer portions, the central portion having a helix pitch that is smaller than that in the two outer portions, wherein the one or more helical grooves extend continuously over the third length, and wherein the helix pitch continuously varies over the third length.

2. The optical fiber apparatus of claim 1, wherein the one or more helical grooves make two or more turns about a fiber axis over the third length.

3. The optical fiber apparatus of claim 1, wherein the one or more helical grooves comprise a single helical groove.

4. The optical fiber apparatus of claim 1, wherein the one or more helical grooves comprise two or more helical grooves spaced apart longitudinally or angularly.

5. The optical fiber apparatus of claim 4, wherein the two or more helical grooves intersect each other.

6. The optical fiber apparatus of claim 5, wherein the two or more helical grooves have opposing handedness.

7. The optical fiber apparatus of claim 3 configured to provide a power output of at least 500 W.

8. The optical fiber apparatus of claim 1, wherein the one or more helical grooves have a depth that varies over the third length.

9. The optical fiber apparatus of claim 1, wherein the one or more helical grooves have a width that varies over the third length.

* * * * *